(12) United States Patent
Grünewald et al.

(10) Patent No.: US 10,648,731 B2
(45) Date of Patent: May 12, 2020

(54) PRODUCTION METHOD FOR PRODUCING WATER-ABSORBING POLYMER PARTICLES AND BELT DRYER

(71) Applicant: BASF SE, Ludwigshafen am Rhein (DE)

(72) Inventors: Gerald Grünewald, Ludwigshafen (DE); Rüdiger Funk, Niedernhausen (DE); Matthias Weismantel, Jossgrund (DE); Karl Possemiers, Speyer (DE)

(73) Assignee: BASF SE, Ludwigshafen (DE)

( * ) Notice: Subject to any disclaimer, the term of this patent is extended or adjusted under 35 U.S.C. 154(b) by 46 days.

(21) Appl. No.: 15/571,862

(22) PCT Filed: Apr. 15, 2016

(86) PCT No.: PCT/EP2016/058323
§ 371 (c)(1),
(2) Date: Nov. 6, 2017

(87) PCT Pub. No.: WO2016/180597
PCT Pub. Date: Nov. 17, 2016

(65) Prior Publication Data
US 2018/0135912 A1  May 17, 2018

(30) Foreign Application Priority Data

May 8, 2015 (EP) .................................. 15166993

(51) Int. Cl.
*C08F 2/00* (2006.01)
*F26B 3/06* (2006.01)
(Continued)

(52) U.S. Cl.
CPC ........... *F26B 3/06* (2013.01); *B01J 20/28016* (2013.01); *B01J 20/3021* (2013.01); *C08F 2/00* (2013.01);
(Continued)

(58) Field of Classification Search
CPC ............... C08F 2/06; F26B 3/06; F26B 21/00
See application file for complete search history.

(56) References Cited

U.S. PATENT DOCUMENTS

| 3,398,467 A | 8/1968 | Brown |
| 4,956,271 A | 9/1990 | Milone |

(Continued)

FOREIGN PATENT DOCUMENTS

| CN | 101516924 A | 8/2009 |
| WO | WO-2006/100300 A1 | 9/2006 |

OTHER PUBLICATIONS

Buchholz, Fredric L., et al. *Modern Superabsorbent Polymer Technology*, "Commercial Processes for the Manufacture of Superabsorbent Polymers." New York: John Wiley & Sons, Inc., 1998, pp. 71-103.
(Continued)

*Primary Examiner* — Rip A Lee
(74) *Attorney, Agent, or Firm* — Marshall, Gerstein & Borun LLP

(57) ABSTRACT

A production process for production of water-absorbing polymer particles including drying an aqueous polymer gel in a belt drier with a conveyor belt. The belt drier is formed with a drier setup substantially comprising the conveyor belt and an air recycling conduit downstream of the drier setup for air recycling, where recycled air is withdrawn from the drier setup and fed back to the drier setup via the air recycling conduit.

21 Claims, 7 Drawing Sheets

Figure 1:
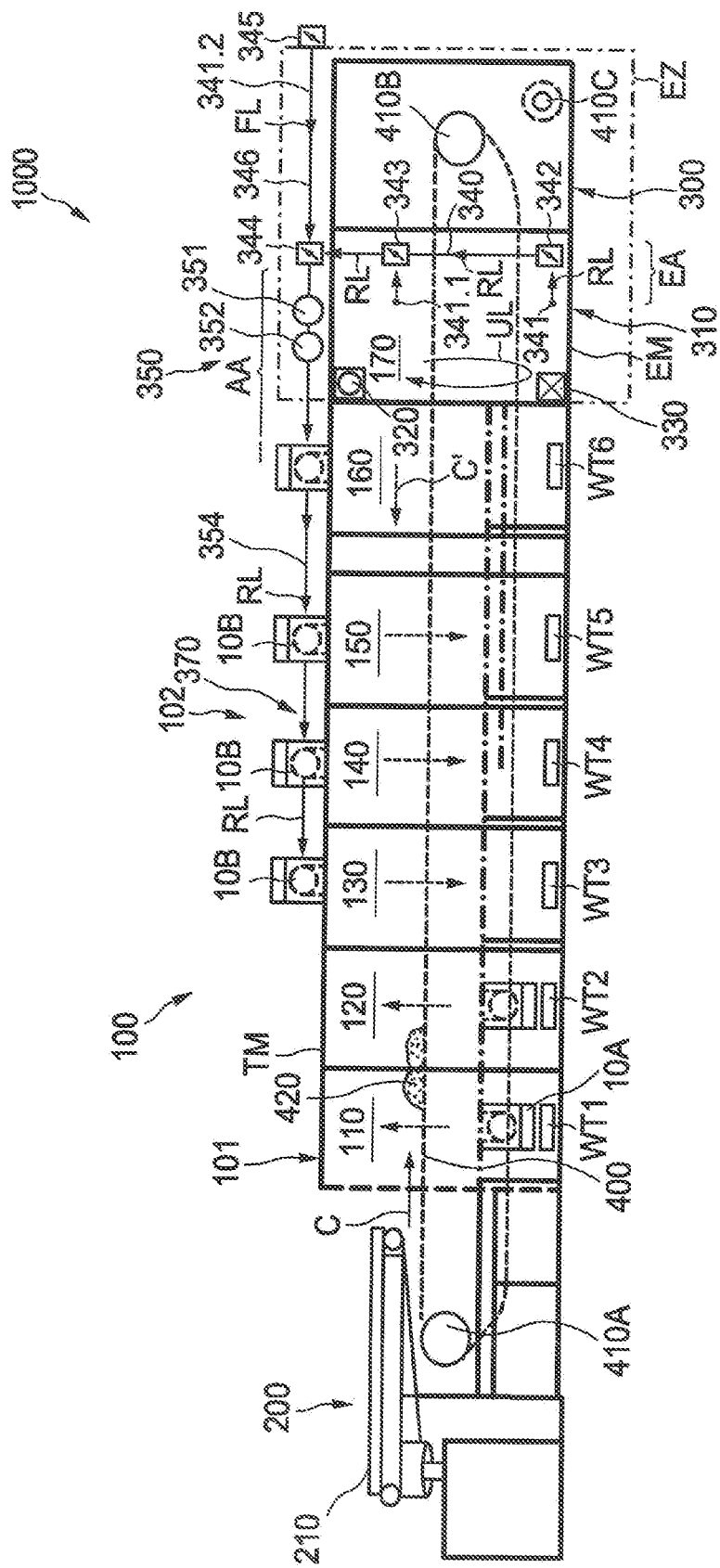

(51) Int. Cl.

| | | |
|---|---|---|
| *F26B 17/04* | (2006.01) | |
| *F26B 21/02* | (2006.01) | |
| *F26B 21/12* | (2006.01) | |
| *C08F 2/01* | (2006.01) | |
| *B01J 20/28* | (2006.01) | |
| *B01J 20/30* | (2006.01) | |
| *C08F 2/06* | (2006.01) | |
| *C08J 3/12* | (2006.01) | |
| *F26B 25/06* | (2006.01) | |
| *B29B 9/10* | (2006.01) | |
| *B29B 9/12* | (2006.01) | |
| *C08F 20/06* | (2006.01) | |

(52) U.S. Cl.
CPC ............... *C08F 2/01* (2013.01); *C08F 2/06* (2013.01); *C08J 3/12* (2013.01); *F26B 17/04* (2013.01); *F26B 21/02* (2013.01); *F26B 21/12* (2013.01); *F26B 25/06* (2013.01); *B29B 9/10* (2013.01); *B29B 9/12* (2013.01); *C08F 20/06* (2013.01); *C08J 2300/14* (2013.01)

(56) References Cited

U.S. PATENT DOCUMENTS

| | | | |
|---|---|---|---|
| 5,651,191 A | 7/1997 | Walunas et al. | |
| 6,174,978 B1* | 1/2001 | Hatsuda | C08F 220/04 |
| | | | 526/240 |
| 8,592,516 B2* | 11/2013 | Weismantel | C08F 6/008 |
| | | | 34/384 |
| 10,005,064 B2* | 6/2018 | Grunewald | F26B 17/04 |
| 10,137,432 B2* | 11/2018 | Grunewald | F26B 17/04 |
| 2010/0016522 A1 | 1/2010 | Stueven et al. | |
| 2014/0047730 A1 | 2/2014 | Weismantel et al. | |

OTHER PUBLICATIONS

Frank, Marcus. (2003): Superabsorbents. In *Ullmann's Encyclopedia of Industrial Chemistry,* 6th ed. (vol. 35, pp. 81-85). Weinheim, Germany: Wiley VCH.
International Search Report for PCT Patent Application No. PCT/EP2016/058323, dated Jul. 8, 2016.

* cited by examiner

PRODUCTION METHOD FOR PRODUCING WATER-ABSORBING POLYMER PARTICLES AND BELT DRYER

CROSS-REFERENCE TO RELATED APPLICATIONS

This application is the U.S. National Phase of PCT/EP2016/058323, filed Apr. 15, 2016, which claims the benefit of European Patent Application No. 15166993.4, filed May 8, 2015.

The invention relates to a production process for producing water-absorbing polymer particles according to the preamble of claim 1. The invention further relates to a belt drier for drying an aqueous polymer gel according to the preamble of claim 11.

The production process has the following steps: polymerizing an aqueous monomer solution or suspension for production of a polymer gel; drying the aqueous polymer gel in a belt drier with a conveyor belt by applying the aqueous polymer gel to the conveyor belt and conveying the polymer gel on the conveyor belt in a conveying direction; crushing and/or grinding the dried polymer gel to give polymer particles.

For drying, the belt drier, especially in the form of an air circulation belt drier for guiding circulated air, is designed with a drier setup essentially comprising the conveyor belt and with an air recycling conduit downstream of the drier setup for air recycling. Recycled air is withdrawn here from the drier setup and fed back to the drier setup via the air recycling conduit. The air recycling conduit has an air withdrawal conduit formed between an upstream intake section relative to air flow direction in the drier setup and a downstream discharge section relative to air flow direction in the air recycling conduit.

Water-absorbing or superabsorbent polymers (SAPs, called superabsorbents for short) refer to crosslinked hydrophilic polymers that can absorb several times their mass in the dry state (sometimes more than one thousand times) of liquids, for example water or similar liquids.

The main field of use of superabsorbents is in the hygiene sector and also plays a major role in the medical sector in wound dressings and plasters. Further important fields of use for superabsorbents are agriculture and horticulture, where superabsorbents are used in order to improve the ability of soil to store moisture.

The demands on a superabsorbent depend on the particular field of use, and for that reason the properties of the superabsorbents (for example the degree of swelling and the swelling rate) have to be adjusted correspondingly. A matter of significance for this purpose is whether the absorption of the liquid to be absorbed is to take place under pressure and/or at relatively high temperature, which is especially important for the use of superabsorbents in incontinence products. Other matters of major significance are the nature and composition of the liquid to be absorbed, since the degree of swelling of a superabsorbent is significantly affected by the salt content of the swelling agent.

The water-absorbing polymers are especially polymers formed from (co)polymerized hydrophilic monomers, graft copolymers of one or more hydrophilic monomers on a suitable graft base, crosslinked cellulose or starch ethers, crosslinked carboxymethylcellulose, partly crosslinked polyalkylene oxide, or natural products swellable in aqueous liquids, for example guar derivatives. Water-absorbing polymers of this kind are used to produce diapers, tampons and sanitary napkins, but also as water-retaining agents in market gardening.

The production of the water-absorbing polymers is described, for example, in the monograph "Modern Superabsorbent Polymer Technology", by F. L. Buchholz and A. T. Graham, Wiley-VCH, 1998 or in Ullmanns "Encyclopedia of Industrial Chemistry", 6th edition, volume 35, pages 73 to 103.

A superabsorbent polymer in the aqueous polymer gel state is regarded as being in a wet state and hence can also be referred to in general terms as wet material; in other words, the aqueous polymer gel still has a considerable proportion of water before drying; especially as described below. The aqueous polymer gel is obtained by polymerizing a monomer solution or suspension. The aqueous polymer gel of still-aqueous polymer particles is preferably introduced into the belt drier in granular form, for example with a solids content of 40-60%. In this state, the polymer gel is basically already in crosslinked form with a desired degree of crosslinking, especially in homogeneously crosslinked form at first, especially with a comparatively low degree of crosslinking, especially, as described further down, barely surface crosslinked at all at first.

A superabsorbent polymer in a water-absorbing polymer particle state is considered to be in a state after drying; in other words, it has a low residual water content of the polymer particles after the drying of aqueous polymer gel, especially as described below; the superabsorbent polymer is thus preferably in the form of a dried polymer gel, especially dried polymer particles. In this state, the water-absorbing polymer particles can preferably be postcrosslinked, especially surface crosslinked, in which case the degree of surface crosslinking is preferably above the above-mentioned comparatively low degree of initially homogeneous crosslinking. Preferably, after the polymerization, an aqueous polymer gel of the water-absorbing polymers is obtained, which is dried. The principles of drying of the aqueous polymer gel to give a water-absorbing polymer comprising water-absorbing, especially dried, polymer particles is likewise described in the monograph "Modern Superabsorbent Polymer Technology", by F. L. Buchholz and A. T. Graham, Wiley-VCH, 1998, on pages 87 to 93.

In the belt drier, the aqueous polymer gel is dried to give a partly dried polymer gel and hence takes the form of a dry cake. The dry cake preferably takes the form of a strand of partly dried polymer gel, i.e. of a partly dried polymer strand, on the belt of the belt drier which thus extends through the drier setup of the belt drier.

The dry cake, at the end of the belt drier, i.e. on leaving the drier setup, is in the form of a substantially dried strand of dried polymer gel, for instance in the form of a slab or of a sheetlike strand, i.e. of a dried polymer strand. The partly dried polymer gel and the dried polymer gel of the dry cake are sometimes already referred to hereinafter by the terminology "dried polymer particles"; both cases are covered by the terms "superabsorbent or water-absorbing polymer gel" or "dried polymer gel", as opposed to "aqueous polymer gel".

Given a comparatively broad size distribution of particles of the aqueous polymer gel to be dried, complete drying of all polymer particles is effected under drying conditions under which a majority of the particles have if anything been overdried. Ultimately, the drying process should also be economically viable and afford the desired product quality. After an appropriate dwell time of the aqueous polymer gel to be dried in the belt drier, it is to be dried to give a superabsorbent polymer comprising water-absorbing polymer particles having a desired water content, preferably low water content and hence residual moisture content.

Accordingly, in practice, drying conditions are chosen that constitute a compromise between exploitation of the drier capacity and the processibility of the water-absorbing polymer particles.

The dried polymer gel in the form of a substantially dried polymer strand is then fed to a crusher or similar comminutor at the end of the belt drier. What are then formed are thus well-dried polymer particles of dried polymer gel.

Some of the dried polymer particles in that case take the form of crushed dried polymer gel, for example comparatively coarse lumps, and some take the form of unavoidable crush residue of dried polymer gel. In particular, the crush residue of dried polymer gel comprises fine polymer particle powder comprising fine and ultrafine particles.

The dried polymer particles are then preferably sent to a grinding operation and processed further to give ground dried polymer particles.

The ground dried polymer particles can then be sent to a sieving operation. A midsize fraction then has an already preferred desired particle size and can be separated off at this early stage. An oversize fraction or fines fraction can optionally be ground, sieved or processed once again and added to the midsize fraction.

The dried, ground and sieved polymer particles of the midsize fraction can be surface reprocessed.

The dried, ground and sieved and surface reprocessed polymer particles can be subjected to safeguard sieving.

In the drying operation, it is possible to use continuous convection belt driers; this relates hereinafter to a belt drier of the type specified at the outset, especially an air circulation belt drier. The belt drier specified at the outset is configured particularly for an aqueous polymer gel, especially for formation of a deformable, pasty product of limited flowability, in piece form. In a continuous belt drier, the product layer of an aqueous polymer gel, applied in the form of an aggregate through which air can flow, on a perforated conveyor belt is transported through the drying space and dried in the process at first to give partly dried polymer gel and finally to give dried polymer gel; the latter is then processed further to give the abovementioned dried polymer particles as water-absorbing polymer particles.

The drying gas that flows through the product layer of the dry cake of partly dried polymer gel and then dried polymer gel serves both to introduce heat into the aqueous polymer gel to be dried or into the partly dried water-absorbing polymer particles and to transport evaporating moisture away. The drying gas used is preferably air as drying air. In an air circulation belt drier, the drying air that flows through the product layer is additionally conducted as circulating air.

In addition, division of the inside region of the drier setup into multiple controllable regions—referred to hereinafter as control zones—permits the establishment of different drying conditions, for example drying temperatures, drying pressures, air humidities or similar drying conditions, for each control zone. The drying/cooling temperatures and other drying conditions within different control zones are adjusted by means of suitably dimensioned heating registers, heat exchangers and supply and removal of drying air. By means of different drying conditions and/or adjustable drying times for the aqueous polymer gel to be dried, it is possible to establish the desired degree of final drying for the water-absorbing polymer particles. Compared to other designs of drier, the belt drier has the advantage that (apart from gravity) there is no significant mechanical stress that impairs the product, since the aqueous polymer gel or the water-absorbing polymer particles lie loose on a conveyor belt. In principle, a belt drier offers the option of configuring the construction of a control zone entirely by means of a single drier zone. In one modification, a belt drier also offers the option of configuring the construction of one control zone of a number of drier zones in full or in part. In the simplest case, the drier setup comprises one control zone and forms a single drier zone. A drier zone may, but need not, have a modular construction, i.e. be constructed by means of a single drier module or a multitude of drier modules. Ultimately, a drier setup can be constructed by means of a number of drier modules. A belt drier comprises, for example, a product application module, a number of drier modules for formation of one or more drier zones, and a discharge module.

The discharge module serves to discharge the superabsorbent polymer in the form of the water-absorbing polymer particles; more particularly, the conveyor belt ends, or has a turning point, in the discharge module; the superabsorbent polymer in the discharge module may fall onto an abovementioned crusher or similar comminutor.

The last drier zone before the discharge module, or else if appropriate a penultimate drier zone or a series of last drier zones before the discharge module, can be utilized for cooling of the water-absorbing polymer particles and may accordingly also be designed without introduction of heat into the water-absorbing polymer particles; in this case, the last drier zone or number of last drier zones before the discharge module may especially be designed without heating registers and/or heat exchangers. A drier zone with removal of heat from the water-absorbing polymer particles is also referred to as cooling zone and may, in principle in any case, be positioned at any of a variety of points in the drier setup. More particularly, the last drier zone before the discharge module is preferably a cooling zone. Preferably, a cooling zone may be provided with an air circulation conduit. This allows a cooling zone to be configured with a shorter construction than without an air circulation conduit.

The last drier zone may, however, in one modification, also have heating registers and/or heat exchangers and the like, and hence have an analogous design to previous drier zones. The last drier zone before the discharge module here, as constructed, has an end module and, especially in the case of a cooling zone, has the feature that the product in the form of the water-absorbing polymer particles exits it at a colder temperature than it entered.

Belt driers having transport belts are to be distinguished from belt reactors. While a belt reactor is used to produce aqueous polymer gel from its starting materials, a belt drier is used to produce water-absorbing polymer particles from an aqueous polymer gel, especially to produce the water-absorbing polymer particles mentioned, preferably from an aqueous polymer gel that has first been homogeneously crosslinked with the desired degree of crosslinking, and optionally also surface crosslinked.

WO 2006/100300 A1 discloses a process for preparing water-absorbing polymers by polymerization of a monomer solution and drying of the aqueous polymer gel obtained by the polymerization in a belt drier by means of a heated air stream, wherein the drying is conducted in at least two temperature zones and/or the flow direction of the drying air stream through the aqueous polymer gel is conducted from beneath in the upstream section of a belt drier and from above in the downstream section of the belt drier. This involves circulating the drying air for it to undergo maximum saturation in multiple passes through the product layer.

For economic drying of the water-absorbing polymers, the air circulation in the drier is systematically designed for energy-efficient operation. Various air circulation concepts are possible, having advantages with regard to drying characteristics and energy exploitation. Preference is given here to overriding circulation of air in cross-countercurrent.

It is an object of the invention to specify an improved production process and an apparatus. More particularly, an energy-efficient drying process is to be specified, preferably with utilization of crosscurrent flow of air circulation.

Preferably, in an improved drying process, the cost and inconvenience associated with maintenance and cleaning is to be reduced, especially with regard to internals in an air recycling conduit, for example the relevant cooling modules and/or drying modules connected therein, especially with regard to heating registers and/or feed air heaters present therein. More particularly, this is to lead to product properties that remain constant over time, coupled with very substantially constant or appropriately adjusted operating parameters. Preferably, introduction of particles into an air recycling conduit, especially into internals in an air recycling conduit—such as cooling modules and/or drying modules, for example heating registers, or similar internals—is reduced. Preferably, introduction of particles into an air recycling conduit is also reduced in the case of an energy-efficient drying process with an air recycling conduit in countercurrent and/or with utilization of air circulation in crosscurrent. Preferably, the belt drier is to be designed for air circulation of drying air against a product stream in the immediate environment thereof.

With regard to the production process, the object is achieved by the invention with a production process of claim 1.

With regard to the apparatus, the object is achieved by the invention with a belt drier of claim 11.

With regard to the production process, the invention proceeds from a production process of the type specified at the outset according to the preamble of claim 1. According to the invention, for drying, a flow cross section in at least one air-removing section of the air withdrawal conduit has an increase in cross section, where the increase in cross section increases a cross section of the air-removing section of the air withdrawal conduit in such a way that the recycled air at least in the air-removing section of the air withdrawal conduit is removed at a reduced flow rate, especially a flow rate lower than a flow rate at a cross section of an air withdrawal line at an upstream point in the air flow and/or lower than an intake rate in the intake section of the air removal conduit, and/or the recycled air at least in an intake section of increased cross section in the air withdrawal conduit is removed at a reduced intake rate. In this case, the reduced flow rate is lower than a flow rate at a downstream cross section of an air withdrawal line relative to air flow direction.

With regard to the belt drier, the invention proceeds from a belt drier of the type specified at the outset according to the preamble of claim 11. According to the invention, a flow cross section in at least one air-removing section of the air withdrawal conduit has been provided with an increase in cross section, where the increase in cross section increases a cross section of the air-removing section of the air withdrawal conduit in such a way that the recycled air at least in the air-removing section of the air withdrawal conduit is removed at a reduced flow rate, especially at a reduced flow rate lower than a flow rate at a cross section of an air withdrawal line at an upstream point in the air flow and/or an intake rate in the intake section of the air removal conduit.

Additionally or alternatively, the recycled air at least in an intake section of increased cross section in the air withdrawal conduit is removable at a reduced intake rate. In this case, the reduced flow rate is lower than a flow rate at a downstream cross section of an air withdrawal line relative to air flow direction.

Advantageous developments of the invention can be taken from the dependent claims and individually specify advantageous ways of implementing the concept elucidated within the scope of the objective and with regard to further advantages.

Preferably, an air withdrawal conduit is connected to a last drier zone (preferably designed as a cooling zone); this development, within the scope of a particularly preferred embodiment, is elucidated in relation to the drawing. In principle, however, an air withdrawal conduit can also be connected to another drier zone of the drier setup. An air-removing section of the air withdrawal conduit is especially understood to mean a section of the air withdrawal conduit directly connected to an intake section of the air withdrawal conduit for recycled air. The air withdrawal conduit is thus connected to an air recycling conduit for recycled air which feeds the recycled air back to the drier setup in an air-supplying section of the air recycling conduit, and for the purpose is likewise connected to the drier setup.

The concept especially encompasses those developments in which the air-removing section is formed with an increase in cross section—based on the recycled air—between the upstream intake section of the drier setup relative to air flow direction and a downstream outlet section in the air recycling conduit relative to air flow direction. The subject matter of the present application especially also encompasses those developments in which the air-removing section having an increase in cross section is formed directly in the upstream intake section of the drier setup relative to air flow direction and/or directly in the downstream outlet section in the air recycling conduit relative to air flow direction. The subject matter also encompasses combinations of such developments.

An increase in cross section is generally understood to mean that the air-removing section has an increased cross section compared to another cross section of an air withdrawal line, such that the recycled air, at least in the air-removing section of the air withdrawal conduit, is removed at a reduced flow rate compared to the other cross section. An increase in cross section which increases a cross section of the air-removing section of the air withdrawal conduit is especially understood to mean that the cross section of the air-removing section is increased from a first upstream cross section relative to air flow direction to a second downstream cross section relative to air flow direction. In this respect, an increase in cross section is additionally or alternatively especially also understood to mean that the air-removing section in the upstream intake section of the drier setup relative to air flow direction has a line intake region having a cross section that forms a significantly enlarged intake region. More particularly, the line intake region is of increased size compared to a further air withdrawal line of the air withdrawal conduit, especially of increased size compared to an air circulation cross section in a conveying means in an air recycling conduit. Correspondingly, a line intake region may have an enlarged cylindrical, oval, angular, especially square or rectangular, or differently shaped cross section of a flow channel, in order to form the enlarged intake region. The line intake region may also take the form, for example, of a diffuser, funnel or similar flow channel form for formation of an enlarged intake region.

Thus, in a first variant of the concept, it may generally be the case that the recycled air at least in the air-removing section of the air withdrawal conduit is removed with a reduced flow rate. This can already be implemented, for example, by providing one or more bypass lines to an air withdrawal line in the air withdrawal conduit. Owing to a bypass line in the air withdrawal conduit, the total cross section of the air-removing section of the air withdrawal conduit is increased in the manner of the concept, namely in that the air withdrawal conduit now has the cross section of the air withdrawal line and the cross section of the bypass line rather than just the cross section of the air withdrawal line. Owing to an increased total cross section of the air withdrawal conduit, the recycled air overall is removed with a reduced flow rate at least in the air-removing section of the air withdrawal conduit.

Advantageously, and additionally or alternatively, the cross section of the air-removing section of the air withdrawal conduit is increased, for example gradually or stepwise over the course of the air-removing section; in other words, the cross section of the air-removing section increases from a first upstream cross section relative to air flow direction to a second downstream cross section relative to air flow direction. With regard to the above example of the bypass line, this second downstream increased cross section relative to air flow direction may be formed at the connection point of the bypass line to the air withdrawal line. Additionally or alternatively, this second downstream increased cross section relative to air flow direction may also be formed in a different way in the air withdrawal line, for example by means of a settling chamber, a centrifugal separator or an expansion region of the air withdrawal line over the course of the air withdrawal line. In this way, the recycled air at least in the air-removing section of the air withdrawal conduit (for example in the downstream increased cross section relative to air flow direction) is removed with a reduced flow rate; in this case, the reduced flow rate is especially reduced compared to an upstream cross section of an air withdrawal line relative to air flow direction, and the flow rate is especially lower than an intake rate in the intake section of the air withdrawal conduit.

It is generally the case, in a second variant of the concept, additionally or alternatively, that the recycled air at least in an intake section of the air withdrawal conduit of increased cross section is removable at a reduced intake rate. This can already be achieved by means of a line intake region of large cross section in the air withdrawal line. In this way, overall, the recycled air is removed at least in the intake section of increased cross section—as the air-removing section of the air withdrawal conduit—the recycled air with a reduced flow rate.

All the above details with regard to the reduced flow rates and increased increases in cross-sectional area are more particularly applicable with reference to equal air conveying rates.

Figure 6:
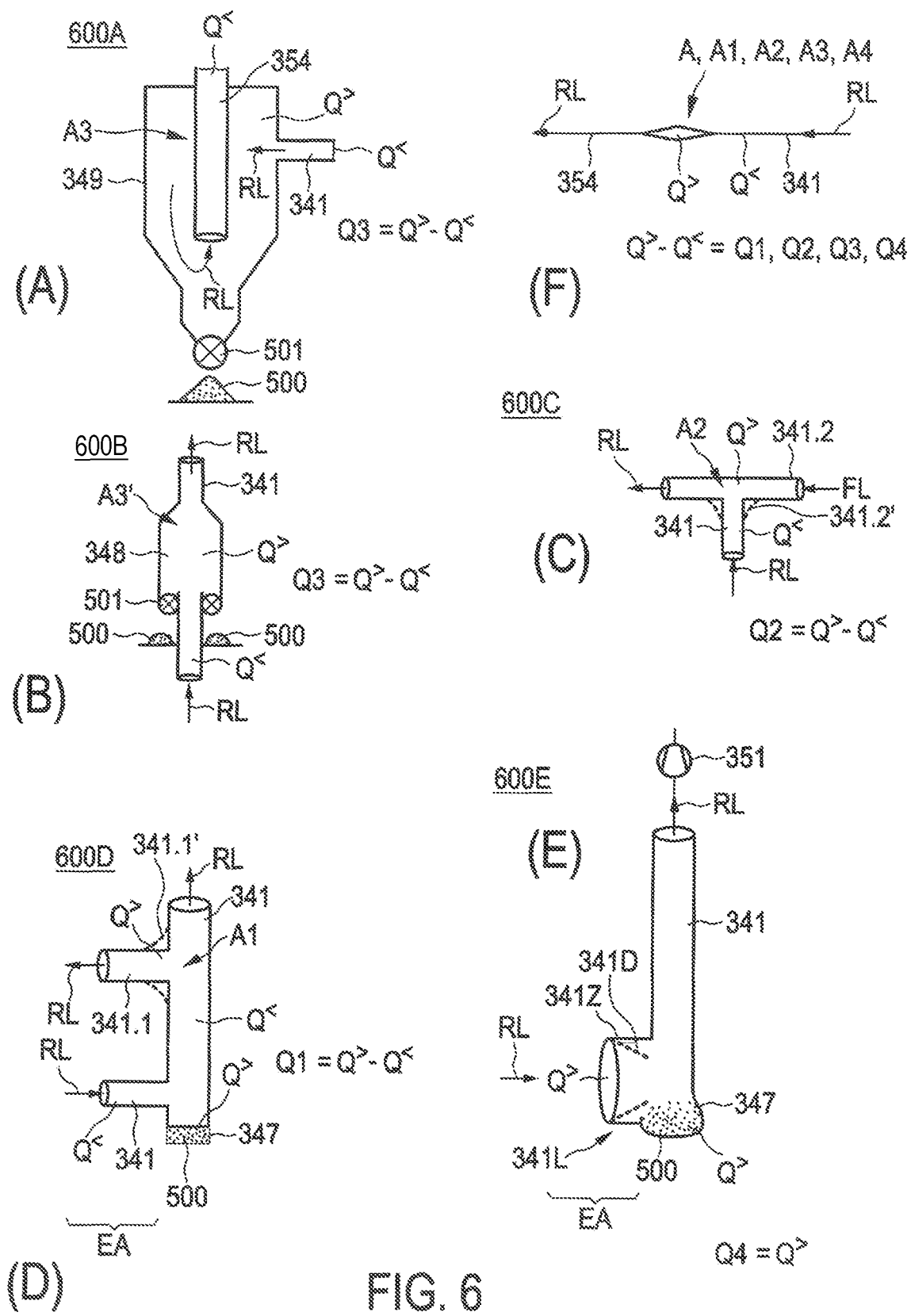

Examples of these variants are claimed individually as developments in the dependent claims and described particularly within the scope of FIG. 6 as working examples.

Air recycling is understood to mean recycling of air withdrawn from the drier setup, which is removed in an air withdrawal conduit and is returned as recycled air counter to the conveying direction of the conveyor belt outside the drier setup, i.e. in countercurrent direction, and is fed back to the drier setup at a point counter to the conveying direction of the conveyor belt, namely in an air-supplying section (air recycling conduit for recycled air RL).

Preferably, but not necessarily, the belt drier takes the form of an air circulation belt drier for guiding of circulated air, wherein a crossing regime of a product stream of aqueous polymer gel to be dried on the conveyor belt in the belt drier and an air circulation stream of the drying air is envisaged.

Cross-countercurrent flow is understood to mean a crossing regime of a product stream of aqueous polymer gel to be dried on the conveyor belt in the belt drier and a stream of the drying air, especially as circulating air (crossflow). In this context, drying air is guided against a product stream in the immediate environment thereof, i.e. counter to a conveying direction of the conveyor belt in the belt drier, i.e. in countercurrent within the drier setup of the belt drier, as it were, constantly in contact, inter alia, with the aqueous polymer gel to be dried on the conveyor belt, but counter to the conveying direction thereof (guiding of drying air against a product stream, countercurrent).

Generally, the concept proceeds from the consideration that polymer particles in the drier setup, especially in a discharge module of the drier, can become detached from the rest of the dry cake material being conveyed on crushing of the strand or sheet of the dry cake. The dried polymer gel in the form of a substantially dried polymer strand is then fed to a crusher at the end of the belt drier. However, even at this stage of breaking off the strand or the sheet, dried polymer particles of dried polymer gel are formed. Some of the dried polymer particles in that case take the form of crushed dried polymer gel, for example comparatively coarse lumps, and some take the form of unavoidable crush residue of dried polymer gel. In particular, the crush residue of dried polymer gel comprises fine polymer particle powder comprising fine and ultrafine particles. The dried polymer gel is thus at least partly already in the form of dried polymer particles even before the crusher or similar comminutor.

Especially polymer particles of this kind, but possibly other polymer particles as well, can be conveyed either into the interior of an air recycling conduit owing to a reduced pressure or through the conveyor belt itself into the air recycling conduit. It is thus also possible to convey such polymer particles with the recycled air in the air recycling conduit in the direction of and as far as internals connected therein, such as cooling modules and/or drying modules. After conveying of the aqueous polymer gel through the drier setup in a conveying direction, the conveyed material, in the form of the water-absorbing polymer particles, in a discharge module or in the last drier zone of the belt drier upstream of the discharge module counter to the conveying direction has a comparatively hard consistency and a comparatively low moisture content. The consistency and moisture content established permit further processing of the conveyed material by crushing or grinding, and a particular particle size distribution on average is possible and desirable. The smaller particles, particulates, dusts, fine dusts and ultrafine dusts that nevertheless form at the same time, especially the fine and ultrafine dusts that arise in the course of crushing, as a result of the transport mentioned, through the recycling, can reach the abovementioned internals (cooling module and/or drying module, and any heating registers or feed air heaters present therein) and impair the functioning thereof and/or block them. More particularly, air at least from the last drier zone can get into feed air heaters and impair or block them, and/or generally impair air flow through accumulation in an air recycling conduit installation. This can proceed to such an extent that the blocking and partial sticking can lead to reduced performance of the internals, such as heating registers or feed air heaters, or generally result, owing to an elevated pressure drop and a resultant reduction in air flow, in impairment of the drying efficiency or in an effect on the product properties.

The starting point for the concept is that a production process with air recycling counter to the conveying direction of the product stream in the form of the superabsorbent polymer is fundamentally advantageous, and can especially lead to improved energy efficiency. The concept has recognised that an increase in cross section in an air withdrawal conduit can increase a cross section of the air-removing section of the air withdrawal conduit to such a significant extent that polymer particles and/or other particles (ultrafine particles, dust, particles) are effectively introduced into the air withdrawal conduit to a merely reduced degree and, if so, entrained polymer particles and/or other particles (ultrafine particles, dust, particles) can settle out. An air withdrawal line in the air withdrawal conduit serves to withdraw air as recycled air, below or above the conveyor belt, from the drier setup and to guide the recycled air withdrawn in the downstream direction relative to air flow direction in the direction of the air recycling conduit, especially in the direction of an outlet section of the air withdrawal conduit and further to an air-supplying air supply section of the air recycling conduit, and especially optionally via internals such as heating registers, heat exchangers, recuperators or the like, preferably by means of one or more conveying means for the recycled air such as an intake, a compressor, a conveyor, a ventilator etc. and other internals.

The upstream section of the air withdrawal line relative to air flow direction has a cross section for accommodating the air withdrawn with an upstream flow rate relative to air flow direction. A downstream section of the air withdrawal line relative to air flow direction should, according to the concept, have an increased downstream cross section relative to air flow direction.

In a preferred first variant, an increase in cross section in an air-removing section of the air withdrawal conduit is provided in such a way that the recycled air at least in the air-removing section of the air withdrawal conduit is generally removed at a reduced flow rate, especially at a reduced flow rate lower than at an upstream cross section of an air withdrawal line relative to air flow direction and/or an intake rate in the intake section. According to the concept, this avoids further transport of polymer particles and other particles according to the first variant.

In a second variant, an intake rate in the intake section is already low, especially significantly lowered. In this case, the reduced flow rate, especially because of the increase in cross section which is significant in the above sense, is significantly lower than at a downstream cross section of an air withdrawal line relative to air flow direction. The latter then already leads, according to the concept, to a reduced intake of polymer particles and other particles according to the second variant.

Overall, the concept utilizes the fact that there is an increase in the static pressure at an increase in cross section, or a fall in the flow rate of the recycled air, especially the withdrawn air. Therefore, the static pressure and the weight of the entrained particles are then predominant over the kinetic flow energy in the air withdrawal conduit—especially in a vertical line section of an air withdrawal line— and the particles fall out of the stream of recycled air.

In other words, the flow rate in the air withdrawal conduit—especially in a vertical line section of an air withdrawal line—decreases to such an extent that the resistance that acts on the entrained particles as a result is overcome by gravity and the entrained particles fall out. It is thus preferable to provide for a flow of recycled air along the air withdrawal line at a comparatively highly varied flow rate, especially a lowered flow rate in said section of the air withdrawal line. Particles having a large particle size (and accordingly high weight) in the flow of recycled air thus settle out even at a correspondingly low flow rate (for example according to the first variant) and/or are not even introduced into the air withdrawal conduit at all (for example according to the second variant). Although it is possible in principle and more likely for particles having a very small particle size (and accordingly very low weight) to get into the air withdrawal conduit, these settle out in the region of the increase in cross section of the air-removing section even at comparatively low flow rate. The lower the flow rate, the more likely it is that even ultrafine dusts of the water-absorbing polymer particle product will settle out. Moreover, the lower the intake rate in the intake section, the fewer particles get into the air withdrawal conduit.

In the context of a development, the value of a flow rate in a conveying means for the recycled air in the air withdrawal conduit and/or the air recycling conduit can be utilized in order to form a reference parameter for a generally reduced flow rate in an air withdrawal conduit owing to an increase in total cross section and/or to a reduction in flow rate at an increase in cross section in an air-removing section of the air withdrawal conduit and/or to an already reduced intake rate in the intake section of the air withdrawal conduit.

For example, it would be possible to lower the intake rate of the recycled air in the intake section of the air withdrawal conduit to less than 50% of the flow rate in a conveying means for the recycled air in the air withdrawal conduit and/or the air recycling conduit by means of a suitable increase in cross section at the line intake region of the intake section (for example as elucidated by FIG. 6(E)). For example, it would be possible to lower the flow rate at the increase in cross section in an air-removing section of the air withdrawal conduit, especially in the line intake region, to less than 50% of the flow rate in a conveying means for the recycled air in the air withdrawal conduit and/or the air recycling conduit by means of a suitable increase in cross section in the air-removing section, especially in the line intake region (for example as elucidated by FIG. 6A-FIG. 6F), and it could be lower than an intake rate in the intake section.

More particularly, the belt drier is a modular belt drier having an application module, a number of drying modules and a discharge module, wherein the aqueous polymer gel is dried by means of the modular belt drier in the multitude of drying modules and the recycled air in the air withdrawal conduit is removed upstream of a discharge module. A modular belt drier of such construction can be matched in a particularly flexible manner to the characteristics of the production requirements.

More particularly, the recycled air is removed in a last drier zone in the conveying direction and/or another drier zone in the downstream region of the drier setup in conveying direction, wherein the section of the air withdrawal conduit is connected for flow purposes to the last drier zone and/or the other drier zone. The last drier zone in conveying direction is preferably formed by means of a last drier module in conveying direction before a discharge module. More particularly, it has been found to be advantageous for the section of the air withdrawal conduit to be connected to a cooling zone; in other words to a drier zone formed without input of heat into the water-absorbing polymer particles, i.e. where they exit at a colder temperature than they enter. The air-removing section can advantageously be integrated into the air withdrawal conduit and/or connected to the air recycling conduit in a flow-connecting manner.

In a particularly preferred development, the section of the air withdrawal conduit is formed by means of a vertical line section of an air withdrawal line, where the vertical line section of the air withdrawal line has the increase in cross section in the form of one or more cross section-increasing air guiding means. Especially in a vertical line section of an air withdrawal line in the air recycling conduit, the weight of the entrained particles is particularly important, such that they fall out of the flow of the recycled air with reduced kinetic energy of the air flow as a result of the increase in cross section; in other words, they can no longer be entrained or carried therewith. As a result, gravity-assisted particle recycling can be effective in a particularly advantageous manner. More particularly, the vertical line section of an air withdrawal line is connected to the last drier zone, especially to the last drying module in conveying direction.

However, the section may also be formed as part of the air withdrawal conduit and/or air recycling conduit by means of a vertical and/or horizontal line section of the air withdrawal line and/or air recycling line, where the vertical and/or horizontal line section of the air withdrawal line and/or air recycling line has the increase in cross section in the form of one or more cross section-increasing air guiding means. In principle, the section may be formed as part of the air withdrawal conduit and/or air recycling conduit by means of a line section of the air withdrawal line and/or air recycling line that runs in any direction.

A cross section-increasing air guiding means is understood in principle to mean a construction and/or geometry of the line section formed so as to expand a downstream cross section of the line section to an upstream cross section of the line section in such a way that the flow rate of recycled air in the downstream cross section of the line section is reduced compared to a flow rate of the recycled air in the upstream cross section. In general, the air guiding means, for this purpose, restricts the flow pathway of the recycled air in a suitable manner in order to achieve lowering of the flow rate according to the Bernoulli principle.

In principle, the section of the air withdrawal conduit with the increase in cross section—i.e. with the connection of one or more cross section-increasing air guiding means—can be formed by a line section of an air withdrawal line in which the increase in cross section in the form of one or more cross section-increasing air guiding means arranged at a level above the conveyor belt or below the conveyor belt.

The connection of a cross section-increasing air guiding means in the form of at least one bypass line, at least one settling chamber and/or at least one centrifugal separator preferably above the conveyor belt is suitable, merely for construction reasons. The connection of a cross section-increasing air guiding means in the form of a line intake region of large cross section, as of an air inlet or similar suction region of increased cross section into the air withdrawal conduit, for example of a cylindrical flow channel or a conically widened flow channel form in the air withdrawal line, preferably below the conveyor belt is suitable; more particularly, a line intake region of large cross section may be arranged in the intake section for formation of an intake region of increased cross section. Air guiding means may be connected above the belt. The air guiding means may also be connected beneath the belt and are especially possible in that the air circulates within the housing of the drier setup and hence the air volume flow with the entrained particles is already led away downward.

More preferably, the air-removing section having the increase in cross section is formed by a line section of an air withdrawal line, especially in a last drier zone, especially in a last drying module in conveying direction, the end module. The preferred development variants of air guiding means which follow can preferably be implemented alone or else in combination.

In a particularly preferred first development variant, an air guiding means is formed by a connection of at least one first bypass line to the line section of the air withdrawal line for formation of a first air-removing section with an increase in cross section, where the at least one first bypass line is designed for withdrawal of air from the drier setup, especially above the conveyor belt. Preferably, the air withdrawal line has a first throttle and/or a second throttle and/or an air recycling line has an overall throttle. This variant can be implemented with a comparatively low level of construction complexity. More particularly, it is possible to adjust flow of recycled air in a comparatively flexible manner by means of the throttles. In the first variant, accordingly, the upstream cross section relative to air flow direction is formed by the additional cross section of at least one internal bypass. This is advantageous since the air taken into the recycled air will actually have been internally heated up and already filtered, since this air has been guided through the bed of the product of dried water-absorbing polymer particles. It is especially possible to provide one, two or more first bypass lines for withdrawal of air from the drier setup. More particularly, one or more of the throttles are configured as regulator throttles.

In a particularly preferred second development variant, an air guiding means is formed by a connection of at least one second bypass line to the line section of the air withdrawal line for formation of a second air-removing section with an increase in cross section, where the at least one second bypass line is designed for supply of fresh air from the environment, especially above the conveyor belt. Preferably, the air withdrawal line has a first throttle and/or an air recycling line has an overall throttle and or an air supply throttle. This variant can likewise be implemented with a comparatively low level of construction complexity and additionally enables the inflow of fresh air to the air recycling conduit. More particularly, it is possible to adjust flow of recycled air in a comparatively flexible manner by means of the throttles. In the second variant, the downstream cross section relative to air flow direction is preferably the additional cross section of an external bypass. This is not optimal from the point of view of energy efficiency (since cold air is being fed in and there is a fall in the amount of heated air conveyed), but is also possible in principle. It is especially possible to provide one, two or more second bypass lines for supply of fresh air from the environment. More particularly, one or more of the throttles are configured as regulator throttles.

A first form of one or more cross section-increasing measures thus relates to at least one bypass. An internal bypass for recycled air or an external bypass serves to reduce the flow rate in the upstream portion of the air withdrawal line relative to air flow direction, i.e. at the bottom in the case of a vertical air withdrawal line; in other words, particles are not sucked in in the first place.

Preferably, an air recycling conduit has a bypass, the bypass being configured such that the recycled air is removed. More particularly, this can, but need not, lead to a variable and/or varying flow rate along the air recycling conduit. The starting point for the development is that the bypass can be varied in terms of its inlet orifice for the recycling of the overall air stream. Preferably, but not necessarily, the bypass may also be varied in terms of its cross section and hence it can generally affect the flow rates in order to achieve settling-out of particles. In a preferred development, the variable increase in cross section or reduction in flow rate makes it possible to affect the settling process or the recycling of recycled air depending on process parameters.

Preferably, the air withdrawal conduit comprises an air withdrawal line having at least one bypass line having a variable increase in cross section. This development leads to an air withdrawal line having an additional bypass line; this is particularly advantageous in order to establish variable flow rates. The variable increase in cross section makes it possible to actively adjust the recycling process with regard to the avoidance of fine dusts in the circulating air. Depending on the bulk density or the particle sizes present, it is thus possible to adjust the corresponding cross sections, in order to reduce the flow rate in such a way that the particles are not entrained.

A second form of one or more cross section-increasing measures relates to a settling region or similar construction element that promotes or brings about the settling-out of particles.

In a particularly preferred third development variant, an air guiding means is formed by a connection of at least one settling chamber or at least one centrifugal separator in the air withdrawal line for formation of a third air-removing section with an increase in cross section, especially above the conveyor belt. Preferably, the air withdrawal line has a first throttle and/or an air recycling line has an overall throttle. This variant can be implemented with a somewhat higher level of construction complexity and enables very effective and adjustable gravity-based separation of particles from recycled air in the air withdrawal line. More particularly, it is additionally possible to adjust flow of recycled air by means of the throttles. The centrifugal separator is preferably configured, especially in a controllable manner, such that entrained polymer particles can settle out. Centrifugal separators are also called cyclones among other names. It is also possible to employ a settling chamber. This involves putting air in a rotating motion by virtue of its own flow rate and the corresponding construction configuration of the separator. The centrifugal forces that act on the particles accelerate them radially outward, as a result of which they are separated and guided inward, removed. A cyclone is advantageous particularly with regard to installation, since there can be increased occurrence of ultrafine polymer particles at the deflecting roll and with the associated crushing of the pieces of polymer gel. The discharge module above the conveyor belt, especially above a deflecting roll of the conveyor belt, offers the option of introducing a further construction element without excessively affecting the mode of function or the recycled air streams with regard to the recycling and/or air circulation lines, heating registers, etc. More particularly, one or more of the throttles are configured as regulator throttles.

In a particularly preferred fourth development variant, an air guiding means is formed by a connection of at least one line intake region of large cross section, for example of a cylindrical, oval, angular, especially square or rectangular, flow channel and/or of an expanding flow channel form in the air withdrawal line for formation of a fourth air-removing section with an increase in cross section, especially beneath the conveyor belt. In particular, the air withdrawal line has a first throttle and/or an air recycling line has an overall throttle. This variant can be implemented with a very low level of construction complexity, and it already enables lowering of the intake of particles in the air withdrawal line. More particularly, it is additionally possible to flexibly adjust flow of recycled air by means of the throttles. The fourth variant thus relates to one or more cross section-increasing measures by means of widening of an air withdrawal line. More particularly, one or more of the throttles are configured as regulator throttles.

In a further development, the air withdrawal conduit comprises an air withdrawal line having an air guiding means and a throttle, especially having a bypass line and/or a first throttle beneath the conveyor belt and/or having a second throttle above the conveyor belt. A throttle may have a throttle valve for active regulation. This advantageous development may, as well as the bypass line which may already constitute a variable increase in cross section, have an additional apparatus which can regulate the flow rate of the total air by means of an air withdrawal conduit. Through the introduction of throttle valves or similar throttles in a pneumatic conveying system, it is possible to adjust the flow rates. More particularly, in the case of mounting of a throttle in the drier setup of the belt drier, a throttle-adjustable valve opening can constitute an additional measure for settling-out entrained particles. The particles can settle out in the lower region of a bypass line and in that case are not conducted through the air withdrawal line into the heating register. By means of a guided throttle opening above and/or beneath the conveyor belt, it is possible to achieve additional optimization with regard to the fine dusts or the flow rates to be set.

Preferably, circulating air is circulated through the polymer gel in a number of drier zones comprising a last drier zone in conveying direction. In principle, the circulation direction of circulating air from the bottom upward through the polymer gel is advantageous, since this has a filtering effect and hence the output of fine dust in the air withdrawal conduit can be reduced. The production process can thus enable optimized air removal with minimum particle output.

More particularly, the circulating air is removed at least partly as recycled air from the last drier zone in the conveying direction by means of the air withdrawal conduit. In other words, circulating air is circulated through the polymer gel particularly in the last drier zone in conveying direction. For circulation of the circulating air, the last drier zone has at least one air circulation ventilator. The last drier zone may also have a supply line for fresh air and a removal line for waste air. The last drier zone may also be connected to at least one air removal conduit for removal of the circulating air, in order to withdraw recycled air. An air circulation ventilator is preferably configured such that air circulation of circulating air in the last drier zone is possible with a portion of ambient air through the polymer gel, and circulated air is removable at least partly with the recycled air into an air withdrawal conduit.

Preferably, in the last drier zone, the circulating air is circulated with a portion of the ambient air, in such a way that it circulates through the polymer gel without a heat exchanger. The circulated air also contributes to the ability to discharge an amount of residual moisture from the product; in this context, the perforated conveyor belt, and preferably also the dried polymer gel lying thereon in the form of a strand—i.e. the partly dried polymer gel and the dried polymer gel of the dry cake and the "dried polymer particles" present therein—act as a kind of filter, and the fine and fine dusts of dried polymer gel that can arise through the circulation remain on the upper conveyor belt and are only discharged in the discharge module at a deflecting roll of the conveyor belt. It has especially been found to be advantageous to establish circulating air in terms of the flow rate. The drying rate or the temperatures present and also the material thickness of the dried polymer on the conveyor belt may play a role with regard to the particles formed in the discharge module, especially particles formed in the crushing or comminuting of the superabsorbent polymer.

A development proceeds from a belt drier for continuous drying of water-absorbing polymer particles; in this case, the belt drier comprises an application module and a last drier zone before the discharge module, especially a last drier zone formed by means of an end module. Preferably, the end module has at least one air circulation ventilator and at least one withdrawal of air; this is to form a circulation of circulating air in the end module. The air circulation ventilator is preferably configured such that the circulating air circulates through the polymer gel in the end module with a portion of ambient air. In addition, it is preferable that circulated air is removed into an air withdrawal conduit. It has been found here to be particularly advantageous that the circulating air is circulated initially in the end module or in what has been assigned as the last drier zone.

Preferably, an air withdrawal conduit has a settling region, especially in or connected to the air withdrawal line, which is configured to reduce the flow rate of the recycled air such that polymer particles entrained in the recycled air, especially also ultrafine polymer particles, can settle out. More particularly, the settling region is chosen such that they are recyclable into the drying process. The starting point for this development is the idea that a calmed zone within or connected to an air withdrawal line offers the option of a flow rate varied down to zero flow for a flow of the recycled air in the air withdrawal conduit, especially in the air withdrawal line. Settling-out even of very light ultrafine particles is enabled. The settling region, for example in the form of a settling chamber, also offers the option of indirectly affecting the rate of flow of the recycled air.

Preferably, the air recycling conduit, especially the air withdrawal conduit, especially an air withdrawal line, has at least one filter element. The filter element is a means of capturing the particles if an additional filter with regard to the fine dusts in terms of their particle size is advantageous as an alternative to or in addition to other construction measures. In the case of process parameters where an elevated amount of air has to be recycled without reducing the flow rate such that all fine dusts settle out, this development enables a reduction in the ultrafine particles in the heating registers in the air recycling conduit.

The particles that separate out or precipitate out of an air stream in the region of a connection of an air guiding means—especially a first or second bypass line, a settling chamber or a centrifugal separator, or a line intake region of large cross section, for example a cylindrical, oval, angular, especially square or rectangular, flow channel and/or a widening diffuser, funnel or similar flow channel form, especially also a settling region or a filter—may be treated in various ways. They can be put directly back into the product stream, i.e., for example, fall into the bunker, for example directly out of the centrifugal separator. They can be taken out of the process at first or for good, i.e. fall into a trap such as a "bigbag" or the like; they can then optionally be fed back in. They can be kept within the process without being part of the product stream; this entails cleaning of the dead space in which the particles can at first be recycled and then, if appropriate, feeding the particles back in.

The concept can especially be implemented with a production process comprising the steps of:

processing a monomer solution or suspension under polymerization to give an aqueous polymer gel,
drying the aqueous polymer gel in a belt drier, wherein the belt drier has a circulating transport belt and the aqueous polymer gel is conveyed on the transport belt.

It is preferably the case here that
the transport belt takes the form of a plate conveyor belt having a number of belt plates separated on an articulated line of an articulated construction, and wherein each belt plate has a surface for accommodating the aqueous polymer gel.

More particularly, this production process may comprise: processing a monomer solution or suspension under polymerization to give a crosslinked aqueous polymer gel.

In the context of a particularly advantageous development, it has been recognised that the concept of the invention or one of the developments thereof is particularly advantageous for a specific production process for superabsorbents, especially for a specific production process for a polymer gel for superabsorbents, which is described hereinafter with a few developments and is partly also elucidated in WO 2006/100300 A1, the disclosure content of which is hereby incorporated by reference into the disclosure content of the present application.

More particularly, this relates to a production process for producing water-absorbing polymer particles by polymerization of a monomer solution or suspension comprising
a) at least one ethylenically unsaturated monomer which bears acid groups and may have been at least partly neutralized,
b) at least one crosslinker,
c) at least one initiator,
d) optionally one or more ethylenically unsaturated monomers copolymerizable with the monomers mentioned under a) and optionally one or more water-soluble polymers.

The water-absorbing polymer particles are produced by polymerization of a monomer solution or suspension and are water-insoluble.

The monomers a) are preferably water-soluble, i.e. their solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid or methacrylic acid and/or salts thereof. Very particular preference is given to acrylic acid and/or salts thereof.

Further suitable monomers a) are, for example, ethylenically unsaturated sulfonic acids, such as styrenesulfonic acid and 2-acrylamido-2-methylpropanesulfonic acid (AMPS), and/or salts thereof.

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, an acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05% to 1.5% by weight, more preferably 0.1% to 1% by weight, most preferably 0.2% to 0.5% by weight, based in each case on monomer a). With rising crosslinker content, centrifuge retention capacity (CRC) falls and the absorption under a pressure of 21.0 g/cm$^2$ passes through a maximum.

Initiators c) used may be all compounds which generate free radicals under the polymerization conditions, for example thermal initiators, redox initiators or photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methyl cellulose or hydroxyethyl cellulose, gelatin, polyglycols or polyacrylic acids, preferably starch, starch derivatives and modified cellulose.

Preference is given to using an aqueous monomer solution. The water content of the monomer solution is preferably from 40% to 75% by weight, more preferably from 45% to 70% by weight and most preferably from 50% to 65% by weight. It is also possible to use monomer suspensions, i.e. monomer solutions with excess monomer a), for example sodium acrylate. As the water content rises, the energy expenditure in the subsequent drying rises and, as the water content falls, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a conveyor belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2, WO 2008/052971 A1 and WO 2011/026876 A1.

The acid groups of a polymer gel obtained have been partly neutralized. Neutralization is preferably carried out at the monomer stage. This is accomplished by mixing in the neutralizing agent as an aqueous solution or else preferably as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the aqueous polymer gel formed in the polymerization. It is also possible to neutralize up to 40 mol %, preferably from 10 to 30 mol % and more preferably from 15 to 25 mol % of the acid groups prior to the polymerization by adding a portion of the neutralizing agent actually to the monomer solution and setting the desired final degree of neutralization only after the polymerization, at the aqueous polymer gel stage. When the aqueous polymer gel is neutralized at least partly after the polymerization, the aqueous polymer gel is preferably comminuted mechanically, for example by means of an extruder, in which case the neutralizing agent can be sprayed, sprinkled or poured on and then carefully mixed in. For this purpose, the gel material obtained can be extruded several times more for homogenization.

The aqueous polymer gel is then preferably dried with a belt drier until a desired, preferably low, water content is established, especially in that a residual moisture content preferably is 0.5% to 15% by weight, more preferably 1% to 10% by weight and most preferably 2% to 8% by weight, the residual moisture content being determined by EDANA recommended test method No. WSP 230.2-05 "Mass Loss Upon Heating". In the case of too high a residual moisture content, the dried polymer gel has too low a glass transition temperature Tg and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 and 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may be single or multistage roll mills, preferably two- or three-stage roll mills, pin mills, hammer mills or vibratory mills.

The mean particle size of the superabsorbent polymer particles removed as ground polymer particles is preferably at least 200 µm, more preferably from 250 to 600 µm and very particularly from 300 to 500 µm. The mean particle size of the polymer particles may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which arises for a cumulative 50% by weight.

The proportion of polymer particles having a particle size of greater than 150 µm is preferably at least 90% by weight, more preferably at least 95% by weight, most preferably at least 98% by weight.

Polymer particles with too small a particle size lower the permeability (SFC). The proportion of excessively small polymer particles ("fines") should therefore be small.

Excessively small polymer particles are therefore removed and recycled into the production process. The recycling is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later production process steps, for example after the surface postcrosslinking or another coating step. In this case, the excessively small polymer particles recycled are surface postcrosslinked or coated in another way, for example with fumed silica.

If a kneading reactor is used for polymerization, the excessively small polymer particles are preferably added in the last third of the kneading reactor.

If the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used. The excessively small polymer particles can also be added at a later stage, but could then possibly be incorporated only inadequately.

Inadequately incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weig ht.

Polymer particles with too great a particle size lower the swell rate. The proportion of excessively large polymer particles should therefore likewise be low.

Excessively large polymer particles are therefore removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amido acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001% to 5% by weight, more preferably 0.02% to 2% by weight and most preferably 0.05% to 1% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the production process are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are hydroxide, chloride, bromide, sulfate, hydrogensulfate, carbonate, hydrogencarbonate, nitrate, phosphate, hydrogenphosphate, dihydrogenphosphate and carboxylate, such as acetate, citrate and lactate. Salts with different counterions are also possible, for example basic aluminum salts such as aluminum monoacetate or aluminum monolactate. Aluminum sulfate, aluminum monoacetate and aluminum lactate are preferred. Apart from metal salts, it is also possible to use polyamines as polyvalent cations.

The amount of polyvalent cation used is, for example, 0.001% to 1% by weight, preferably 0.005% to 0.5% by weight and more preferably 0.02% to 0.2% by weight, based in each case on the polymer particles.

The surface postcrosslinking is performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting characteristics and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably conducted in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany), Holo-Flite® driers (Metso Minerals Industries Inc.; Danville; USA) and Nara Paddle Dryer (NARA Machinery Europe; Frechen; Germany). Moreover, fluidized bed driers may also be used.

The drying can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and at most 60 minutes.

In a preferred embodiment of the present invention, the surface postcrosslinked water-absorbing polymer particles are cooled after the thermal drying. The cooling is preferably performed in contact coolers, more preferably paddle coolers and most preferably disk coolers. Suitable coolers are, for example, Hosokawa Bepex® Horizontal Paddle Cooler (Hosokawa Micron GmbH; Leingarten; Germany), Hosokawa Bepex® Disc Cooler (Hosokawa Micron GmbH; Leingarten; Germany), Holo-Flite® coolers (Metso Minerals Industries Inc.; Danville; USA) and Nara Paddle Cooler (NARA Machinery Europe; Frechen; Germany). Moreover, fluidized bed coolers may also be used.

In the cooler, the surface postcrosslinked water-absorbing polymer particles are cooled to 20 to 150° C., preferably 30 to 120° C., more preferably 40 to 100° C. and most preferably 50 to 80° C.

Subsequently, the surface postcrosslinked water-absorbing polymer particles can be classified again, excessively small and/or excessively large polymer particles being removed and recycled into the production process.

For further improvement of the properties, the surface postcrosslinked water-absorbing polymer particles can be coated and/or remoisturized, especially coated with additives or other coatings and/or remoisturized with water.

The remoisturizing is preferably performed at 30 to 80° C., more preferably at 35 to 70° C., most preferably at 40 to 60° C. At excessively low temperatures, the surface postcrosslinked water-absorbing polymer particles tend to form lumps, and, at higher temperatures, water already evaporates to a noticeable degree. The amount of water used for remoisturizing is preferably from 1% to 10% by weight, more preferably from 2% to 8% by weight and most preferably from 3% to 5% by weight, based in each case on the surface postcrosslinked water-absorbing polymer particles. The remoisturizing increases the mechanical stability of the polymer particles and reduces their tendency to static charging. The remoisturizing is advantageously performed in the cooler after the thermal drying.

Suitable coatings for improving the free swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The surface postcrosslinked water-absorbing polymer particles produced by the production process have a moisture content of preferably 0% to 15% by weight, more preferably 0.2% to 10% by weight and most preferably 0.5% to 8% by weight, the moisture content being determined by EDANA recommended test method No. WSP 230.2-05 "Mass Loss Upon Heating".

The surface postcrosslinked water-absorbing polymer particles produced by the production process have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the surface postcrosslinked water-absorbing polymer particles is less than 60 g/g. The centrifuge retention capacity (CRC) is determined by EDANA recommended test method No. WSP 241.2-05 "Fluid Retention Capacity in Saline, After Centrifugation".

The surface postcrosslinked water-absorbing polymer particles produced by the production process have an absorption under a pressure of 49.2 g/cm$^2$ of typically at least 15 g/g, preferably at least 20 g/g, preferably at least 22 g/g, especially preferably at least 24 g/g and most preferably at least 26 g/g. The absorption under a pressure of 49.2 g/cm$^2$ of the surface postcrosslinked water-absorbing polymer particles is less than 35 g/g. The absorption under a pressure of 49.2 g/cm$^2$ is determined analogously to EDANA recommended test method No. WSP 242.2-05 "Absorption Under Pressure, Gravimetric Determination", except that a pressure of 49.2 g/cm$^2$ is established instead of a pressure of 21.0 g/cm$^2$.

Working examples of the invention are now described hereinafter with reference to the drawing. These are not necessarily intended to represent the working examples to scale; instead, the drawing, serving for elucidation, is executed in schematic and/or slightly distorted form. With regard to additions of the teachings immediately apparent from the drawings, reference is made to the relevant prior art. It should be taken into account here that various modifications and alterations relating to the form and the detail of an embodiment can be undertaken without departing from the general idea and the concept of the invention. The features of the invention disclosed in the description, in the drawing and in the claims may be essential to the development of the invention either individually or in any combination. Moreover, the scope of the invention includes all combinations of at least two of the features disclosed in the description, the drawing and/or the claims. The general idea and the concept of the invention is not restricted to the exact form or the detail of the preferred embodiments shown and described hereinafter, or restricted to subject matter that would be limited compared to the subject matter claimed in the claims. In the case that ranges of dimensions are given, any values within the limits mentioned shall also be disclosed as limiting values and shall be usable and claimable as desired. Further advantages, features and details of the invention will be apparent from the description which follows, from the preferred working examples and from the drawing.

Figure 2:
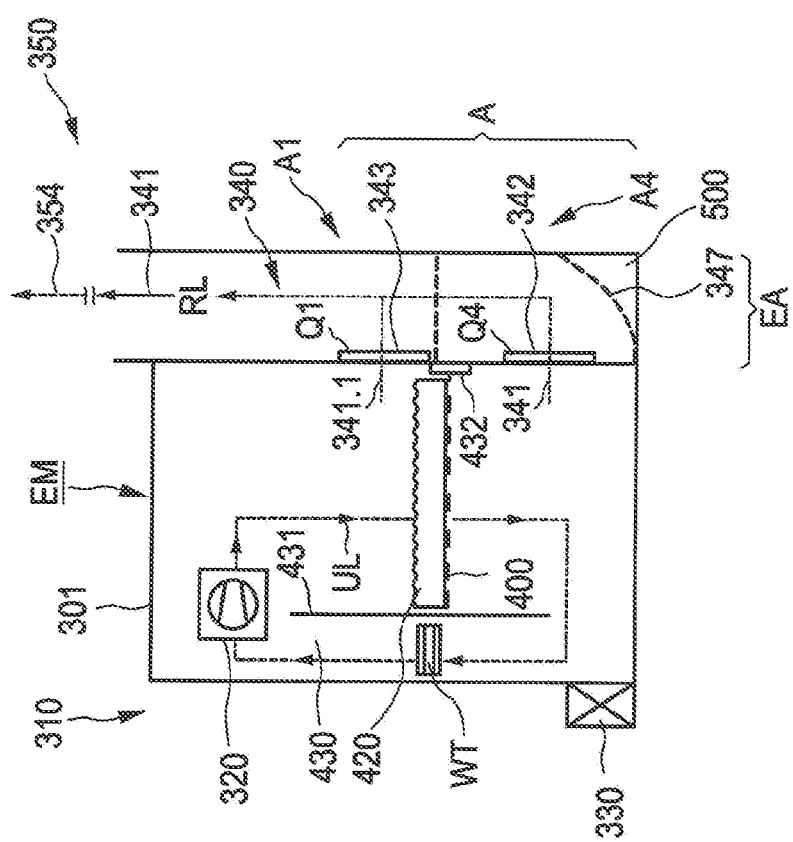
Figure 3A:
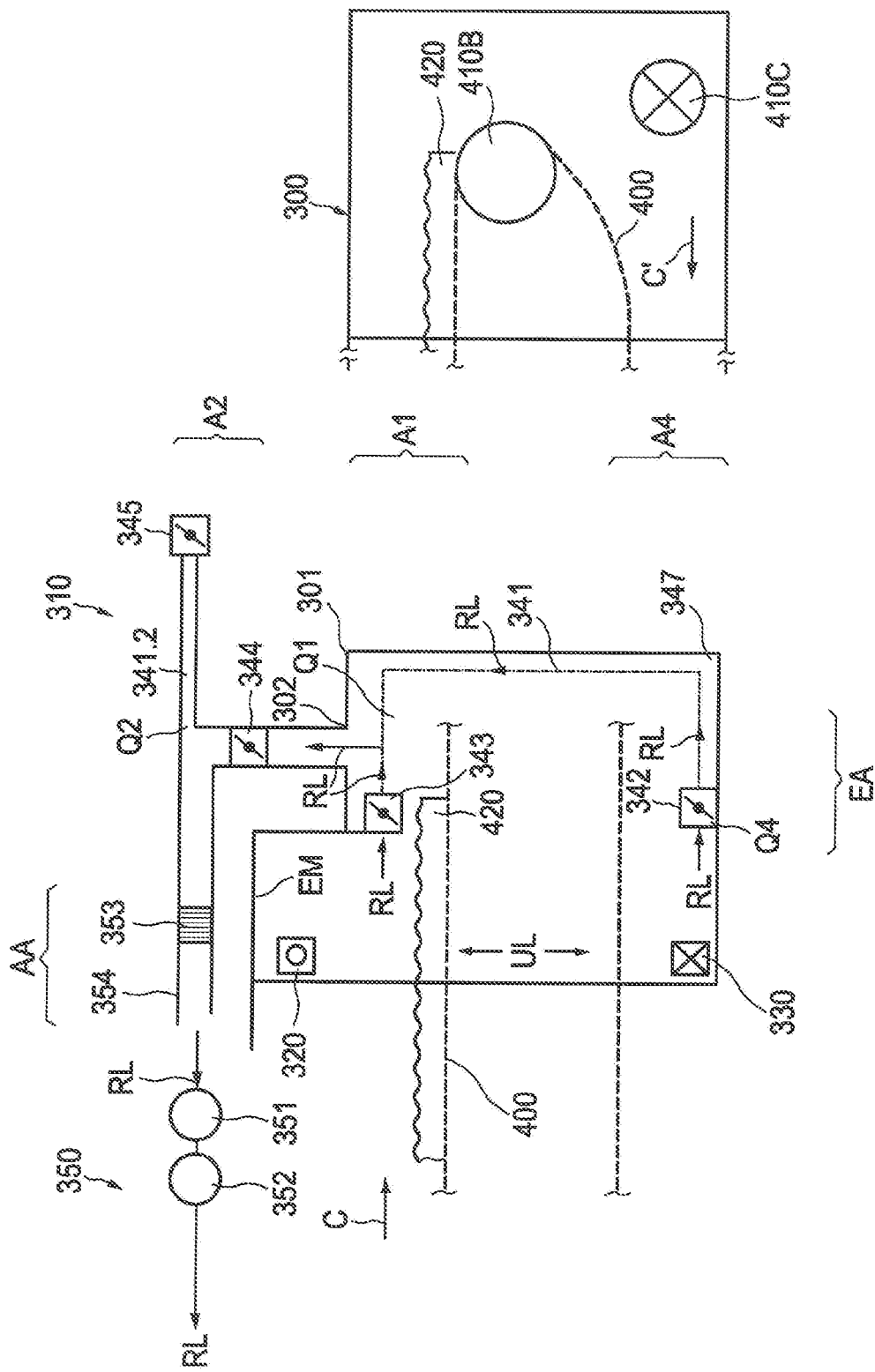
Figure 3B:
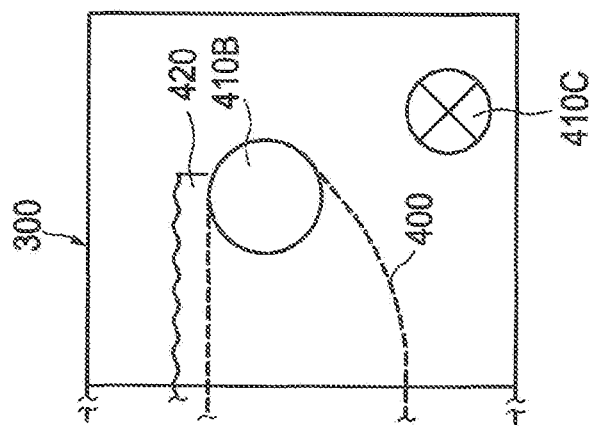
Figure 3B:
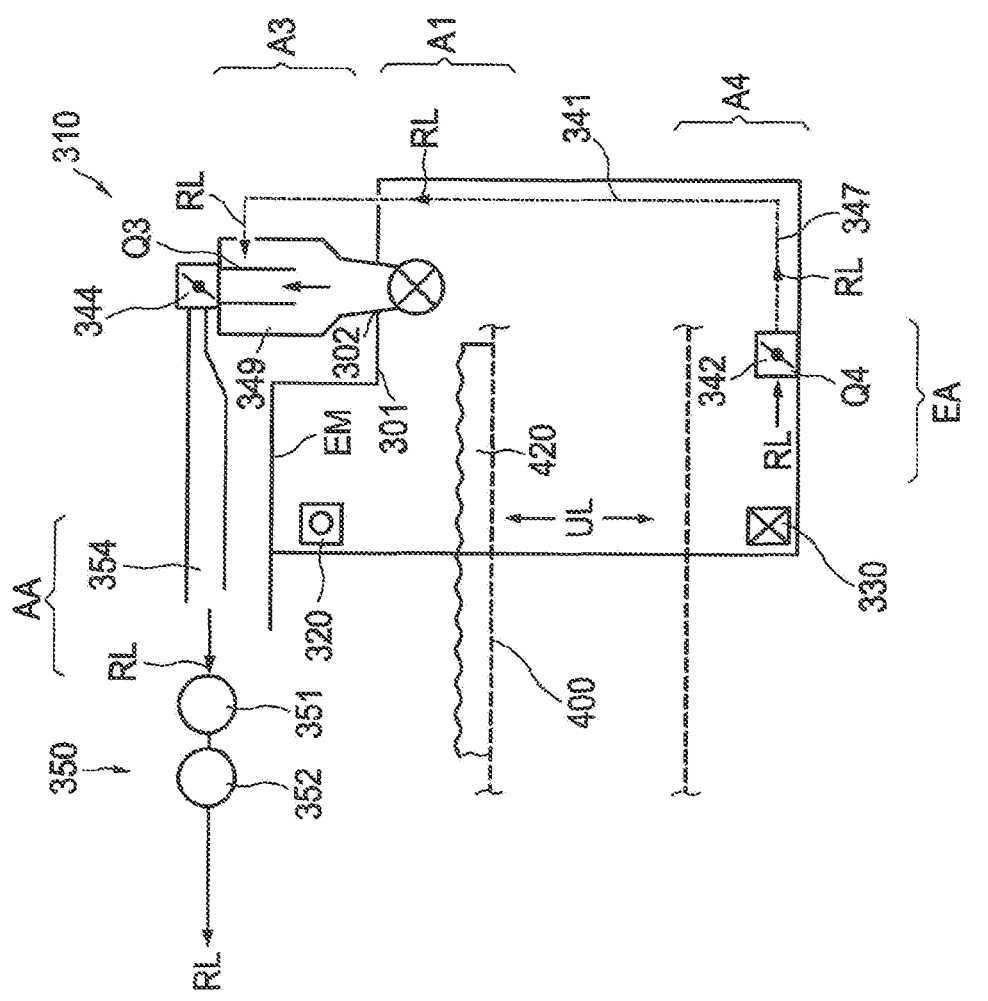
Figure 4:
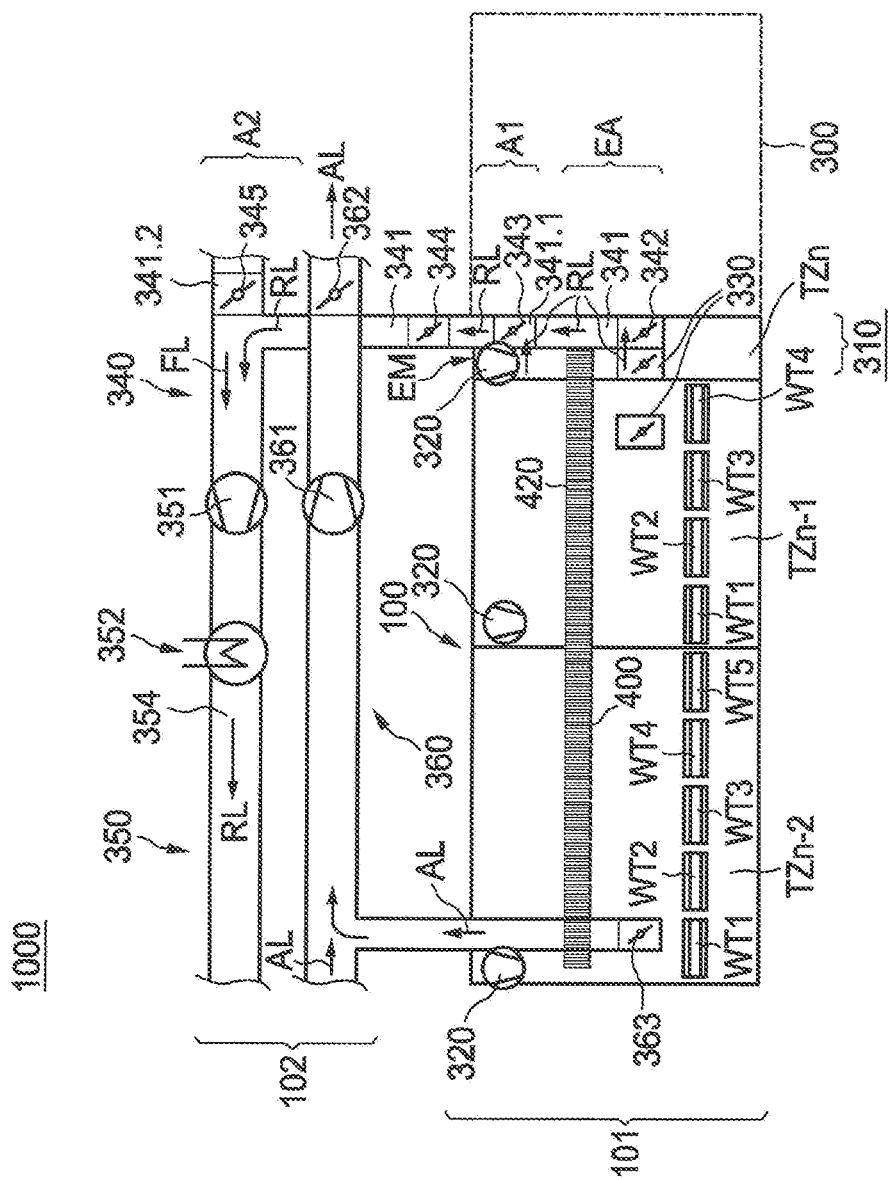
Figure 5:
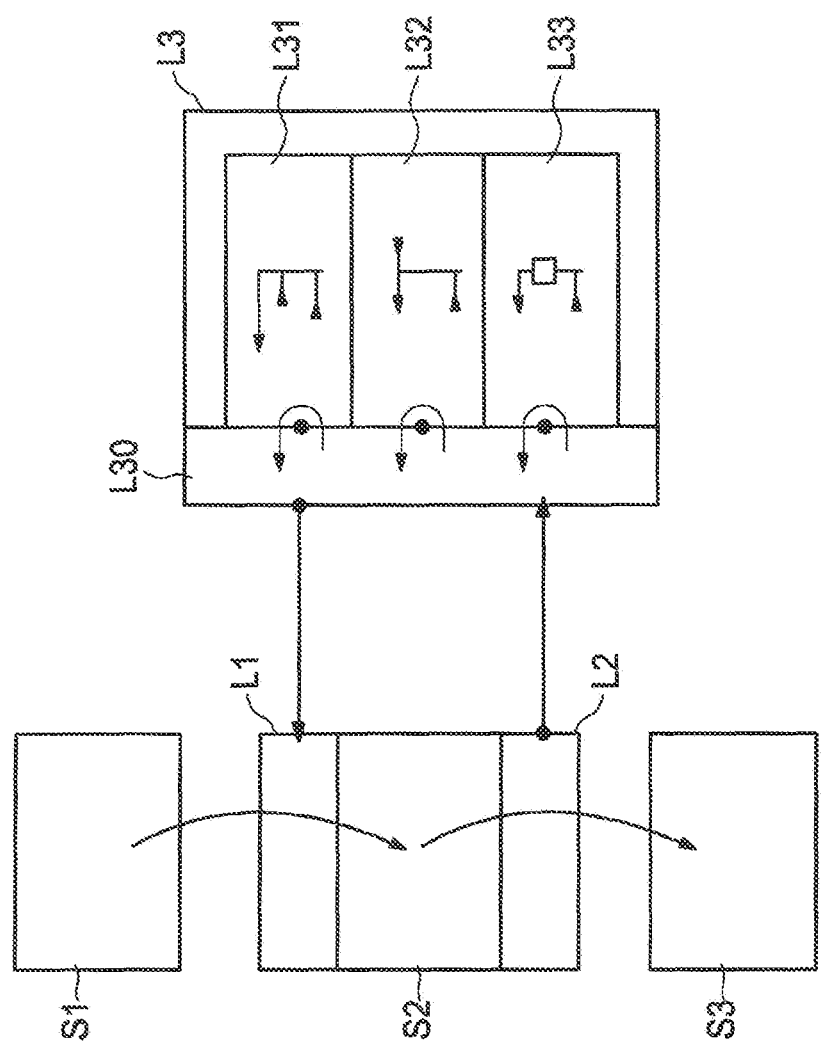

The specific drawings show:

FIG. 1 a schematic diagram of an air circulation belt drier in a particularly preferred first embodiment in a section in line with conveying direction C;

FIG. 2 a schematic diagram of a last drying zone before a discharge module in an air circulation belt drier from FIG. 1 counter to conveying direction C in a section at right angles to conveying direction C;

FIG. 3A a schematic diagram of a last drying zone before a discharge module in an air circulation belt drier from FIG. 1 in a section in line with conveying direction C;

FIG. 3B a schematic diagram of a last drying zone before a discharge module in an air circulation belt drier according to a particularly preferred second embodiment in a modification of the embodiment from FIG. 1 in a section in line with conveying direction C;

FIG. 4 a schematic diagram of a downstream region of an air circulation belt drier with a last drying zone before a discharge module in line with conveying direction C according to a particularly preferred third embodiment in a development of the embodiment from FIG. 1;

FIG. 5 a schematic flow diagram of a particularly preferred embodiment of a production process;

FIG. 6A a basic construction in schematic form of a cross-section-increasing air guiding means in a line section of an air withdrawal line in a first modification similar to the second embodiment;

FIG. 6B a basic construction in schematic form of a cross-section-increasing air guiding means in a line section of an air withdrawal line in a second modification analogous to the second embodiment;

FIG. 6C a basic construction in schematic form of a cross-section-increasing air guiding means in a line section of an air withdrawal line in a third modification similar to the first embodiment;

FIG. 6D a basic construction in schematic form of a cross-section-increasing air guiding means in a line section of an air withdrawal line in a fourth modification similar to the first embodiment;

FIG. 6E a basic construction in schematic form of a cross-section-increasing air guiding means in a line section of an air withdrawal line in a fifth modification similar to the first embodiment;

FIG. 6F an embodiment in symbolic form in which a cross-section-increasing air guiding means, such as a cross-section-increasing air guiding means as shown in FIG. 6A to FIG. 6E, is implemented in a horizontal line section.

In the drawings, for the sake of simplicity, identical reference numerals have been utilized for identical or similar parts or parts of identical or similar function.

FIG. 1 shows, in principle, a belt drier, here by way of example in the form of an air circulation belt drier 1000, constructed in modular form in the present embodiment. The air circulation belt drier 1000 has an application module 200, a drier setup 101 having a drying module 100 (also referred to as TM) having multiple drier zones 110, 120, 130, 140, 150, 160, 170, and a discharge module 300. In the air circulation belt drier 1000, wet material in the form of the aqueous polymer gel is applied continuously and homogeneously to a horizontal conveyor belt 400 in the application module 200, and this then passes through the drying module 100, i.e. the interior of the drier setup 101, on the conveyor belt 400, in conveying direction C. The air circulation belt drier 1000 takes the form of a single-belt drier and may, in a modification, analogously be replaced by a multistage drier or a multilevel or even multibelt drier. Overall, a distinction can be made in the individual drier types between a through-flow drier and an overflow drier; the air circulation belt drier 1000 shown in FIG. 1 is a through-flow drier.

For performance of the drying process, an air circulation belt drier 1000 with an endless conveyor belt 400 guided over bearing elements and at least two deflecting rolls, here a upstream deflecting roll 410A and a downstream deflecting roll 410B, is used, of which, in the present case, at least one deflecting roll is driven and one is adjustable. The bearing case of the upstream deflecting roll 410A of the conveyor belt 400 and the associated mechanical belt tensioning device, in this present case, are in the application module 200, and the driveshaft with the inserted belt drive in the discharge module 300. On the conveyor belt 400 of the air circulation belt drier 1000, the aqueous polymer gel is gradually run through the multiple drier zones 110, 120, 130, 140, 150, 160 arranged in succession and through the last drier zone 170 to the discharge module 300. The modules assigned to the drier zones 110, 120, 130, 140, 150, 160, 170, in terms of construction, are formed from standardized metal sheets stiffened with profiles as base, side and top walls and are divided with partition plates. In the present case, the last drier zone 170, in terms of construction, is implemented as an end module EM upstream of the discharge module 300.

The application module 200 is formed here with profiles of stiffened standardized base and side sheets. The product applicator 210 may be a pivot belt suitable for sensitive free-flowing products in particular. In addition, in modifications, a distributor screw or a pivot arm application device could be utilized.

On the top side of the conveyor belt 400, the product is applied in the form of aqueous polymer gel and transported by means of the conveyor belt 400 toward the discharge module 300, where it arrives in the form of dried superabsorbent polymer 420 with water-absorbing polymer particles.

The transport belt variants are shown here in the form of a simple conveyor belt, but may also be a chain-driven wire mesh belt, a hinged plate belt, an interlaced belt or a wire mesh belt which is guided in a chain-free manner. The wet material to be dried, in the form of aqueous polymer gel, lies on a conveyor belt 400 which is perforated here, and the drying air represented by arrows flows through it in different flow directions. Drying air flows through or over the wet material in the form of aqueous polymer gel while it is being transported on the conveyor belt through the interior of the drier setup 101 in line with conveying direction C, and it is dried as a result. The drying air is firstly guided—preferably in a plane transverse to conveying direction C—as circulating air UL, which is symbolized by way of example in FIG. 1 by an arrow in the drier zone. By means of the guiding of drying air as circulating air UL, within a drier zone, especially within each of drier zones 110, 120, 130, 140, 150, 160, 170, this air undergoes maximum saturation with moisture in the course of multiple passages through the drying aqueous polymer gel. A certain proportion of the drying air (shown in FIG. 1 and FIG. 4 in countercurrent direction C' opposite conveying direction) leaves the air circulation belt drier 1000 in the form of waste air AL highly saturated with moisture and thus removes the amount of water evaporated out of the product; a corresponding waste air conduit 360 is elucidated by way of example in relation to FIG. 4.

A drier zone may also be regarded as part of a control zone for air circulation purposes for establishment of appropriate drying conditions, to which there are assigned an air input and output with a heating register/ventilator 10A, 10B incorporated or installed within the scope of a ventilation setup 102 and/or a heat exchanger WT—here for each drier zone 110, 120, 130, 140, 150, 160 with WT1, WT2, WT3, WT4, WT5, WT6; a more detailed working example in this regard, similar to that of FIG. 1, is elucidated in relation to FIG. 2.

In this working example of FIG. 1, in the drying module 100, the drier zones 110, 120, 130, 140, 150, 160, 170 are shown and these are operated substantially under reduced pressure and with an appropriate temperature profile established for the entire drier setup 101. For this purpose, as symbolized by means of the arrow in countercurrent direction C' in FIG. 1, drying air is guided against a product stream of the aqueous polymer gel 420 to be dried in the immediate environment thereof, i.e. counter to a conveying direction C of the conveyor belt 400 in the belt drier in countercurrent direction C', i.e. in countercurrent within the drier setup 101 of the belt drier, as it were, constantly in contact, inter alia, with the aqueous polymer gel 420 to be dried on the conveyor belt 400, but counter to the conveying direction C thereof (guiding of drying air against a product stream, countercurrent).

Each drier zone may, but need not, be implemented as a single drier module. Each drier zone may, but need not, also be implemented with a number of drier modules. A modular construction can have advantages if the construction of the air circulation belt drier 1000 is to be simplified; for example for manufacturing reasons as well. In principle, the drier setup 101, with limitations, is modifiable in a comparatively simple manner even thereafter.

In the present case, the drier zones 110, 120, 130, 140, 150, 160 are each formed by a drier module and have at least one air circulation ventilator 10A, 10B, advantageously with a heating register. It is possible here for each drier zone 110, 120, 130, 140, 150, 160 to be controlled individually. The flow rate of drying air (or if appropriate cooling air) toward the product may be varied, such that the parameters can be matched accordingly in terms of the desired product quality. The inflow direction through the superabsorbent polymer gel may be from the bottom upward or from the top downward. The drying arrangement of an air circulation belt drier 1000 shown in FIG. 1 shows that, in a drier zone, or here in the upstream drier zones 110 and 120, the air flow toward the polymer gel 420 in the form of aqueous polymer gel is from the bottom upward and then, in the drier zones 130, 140 and 150 and 160, the air flow toward the polymer gel 420 in the form of superabsorbent polymer is from the top downward. This increasingly transforms the superabsorbent polymer, as a result of drying, from aqueous polymer gel to dried polymer gel in the form of a sheetlike strand.

The drying time can be affected to a relative degree by the belt speed of the conveyor belt 400, which may be continuously adjustable. The product in the form of water-absorbing polymer particles that cohere and/or adhere to one another on the conveyor belt to form a sheetlike strand is thrown off the belt after the drying process and the sheetlike strand is crushed and then the water-absorbing polymer particles are ground in accordance with the particle size to be established. The discharge module 300 is configured such that the dried superabsorbent polymer 420 is removable in strand form, i.e. removable with water-absorbing polymer particles that cohere or adhere to form the strand; the strand in the region of the downstream deflecting roll 410B slides into a crusher 410C.

The first and second deflecting rolls 410A and 410B ensure that the conveyor belt 400 is returned beneath the product layer—and in the present case also within the drier setup 101 (in principle, this would also be possible, in a modification, outside of a drier setup)—counter to conveying direction C, i.e. in the direction of countercurrent direction C', and is available again in an endless loop for further application of aqueous polymer gel. The air circulation belt drier 1000 has been designed so as to obtain optimal drying characteristics of the aqueous polymer gel applied, with reduced production time and/or elevated throughput rate in the drying as the case may be, and hence as the case may be to reduce production costs.

The dotted lines in FIG. 1 in the downstream part of the air circulation belt drier 1000 symbolize an end zone EZ which comprises the last drier zone 170 with an end module EM and the discharge module 300. The last drier zone 170 is elucidated hereinafter with reference to the reference numeral 310 which will be cited further, specifically with reference to multiple examples in FIG. 2 to FIG. 7. In a modification, the last drier zone 170—called 310 in a development and hereinafter—of the air circulation belt drier 1000 may also be formed as part of the discharge module 300 or integrated with the discharge module 300 within an end zone EZ. According to FIG. 1, in the region of the last drier zone 170, circulating air UL is circulated through the dried superabsorbent polymer 420. To some degree, recycled air RL, as shown in detail in FIG. 2, is withdrawn by means of an air withdrawal conduit 340. Preferably, a flow rate of the recycled air RL may vary along the air withdrawal conduit 340. The recycled air RL is in any case fed back to the drier zones 110, 120, 130, 140, 150, and optionally also back to the drier zone 160, via the abovementioned heating registers/ventilators 10A, 10B incorporated or installed within the scope of a ventilation construction 102 and/or via a heat exchanger.

In the present case, in the lower portion of the conveyor belt, an air supply element 330 is arranged in the last drier zone 170. An air circulation ventilator 320 or similar air conveying means, in the present case, is arranged in the upper region of the conveyor belt 400. Thus, circulating air UL is circulated through the dried water-absorbing polymer particles, as indicated in FIG. 1 by the direction of the arrow for the circulating air UL. Thus, advantageous drying characteristics are assured in the last drying zone 170 too.

Following the concept of the invention, in the working example shown in FIG. 1 for removal of recycled air RL, an air withdrawal conduit 340 is connected for flow purposes to the last drier zone 170, and an air withdrawal line 341 is connected thereto. To this are connected an air withdrawal line 341 of the air withdrawal conduit 340 and a bypass line 341.1 with a variable increase in cross section. The corresponding air withdrawal conduit 340 is integrated in the end module EM. The bypass line 341.1 is likewise connected to the air withdrawal line 341 and is configured such that the recycled air RL is removed with a varying flow rate along a preferably vertical line section of the air withdrawal line 341.

The air withdrawal conduit 340 is connected for flow purposes to an air recycling conduit 350, and for this purpose the air withdrawal line 341 is connected to an air recycling line 354. In addition, in the air recycling conduit 350 in FIG. 1, fresh air FL can be supplied via an air supply line 346 connected to the air recycling line 354. The air withdrawal line 341, the bypass line 341.1 and the air supply line 346, in the intake region of the line, have a first, second and fourth throttle 342, 343, 345 as withdrawal air throttle, withdrawal air bypass throttle and air supply bypass throttle, or a third throttle 344 is disposed in the air recycling line 354 as overall throttle.

Following the concept of the invention, in a modification, in a working example which is not shown here for removal of recycled air RL, an air withdrawal conduit 340 may also be connected for flow purposes to the penultimate drier zone 160, and optionally also to a drier zone 150 arranged upstream thereof or another drier zone in the downstream region of the drier setup in conveying direction C. The recycling of recycled air RL is found to be possible at least when the saturation thereof with moisture from the amount of water evaporated out of the product is not too high; in other words, when the recycling of the recycled air RL into one of the upstream drier zones does not cause a significant increase in the absolute air moisture content at least at that point.

FIG. 2, supplementing the first preferred embodiment of FIG. 1, shows the end module EM of the last drier zone 310 (referred to as 170 in FIG. 1) in a section transverse to conveying direction C, with a housing 301 and the perforated conveyor belt 400 counter to conveying direction. On the conveyor belt 400 in the end module EM, the dried superabsorbent polymer 420 comprising water-absorbing polymer particles has been applied as elucidated with reference to FIG. 1. The direction of air circulation for the circulating air UL is shown by an arrow. The direction is defined by the operation of an air circulation ventilator 320 in the upper region of the housing 301 or of the drier setup 101, and an air supply element 330 in the lower region of the housing 301 or of the drier setup 101. The air circulation ventilator 320 is arranged in the upper region of the interior of the drier setup 101, i.e. above the conveyor belt 400. The circulating air, as shown in FIG. 2, in the interior of the end module EM of the last drying zone 310, is circulated through the conveyor belt, wherein, in the example shown, the circulating air flows at least partly from the top downward through the dried superabsorbent polymer 420 comprising water-absorbing polymer particles. The conveyor belt 400, in the present case, is sealed on the inside of the housing 301 of the drier setup 101 by means of a seal 432 with respect to said housing, in order to prevent circulating air UL from getting past the conveyor belt 400 into the region beneath the conveyor belt 400 to any great degree. At the side of the conveyor belt 400, the circulating air UL is conveyed back upward past the conveyor belt. At the same time, the circulating air flows correspondingly from the bottom upward through a heat exchanger WT in the end module EM of the last drying zone 310. The circulation of the circulating air is maintained by means of the air circulation ventilator 320. For this purpose, the heat exchanger WT is arranged in a kind of shaft 430 in which the circulating air UL also flows from a region beneath the conveyor belt 400 into a region above the conveyor belt 400; the shaft 430 is formed by a wall of suitable guiding means 431 at the side of the conveyor belt 400 and by an otherwise unspecified wall of the housing 301 of the drier setup 101.

In this respect, the end module EM here forms the last drier zone 310 before the discharge module 300; in principle, the end module EM, in a modification, may also be executed without a heat exchanger WT—even with a heat exchanger WT, but especially without a heat exchanger WT, the last drier zone 310 is designed such that heat is removed from the water-absorbing polymer particles, but there is no introduction of heat into the water-absorbing polymer particles, and so they emerge at a colder temperature than they enter; the last drier zone 310 before the discharge module 300, and in principle the whole end module EM then acts (as in the present case) as a cooling zone.

Recycled air RL is withdrawn from the drier setup 101 in an intake section EA of the air withdrawal conduit 340 and fed back via the air recycling conduit 350 to the drier setup 101 in an air-supplying section 370. The air recycling conduit 350 thus has the air withdrawal conduit 340 formed between an upstream intake section EA relative to air flow direction in the drier setup 101 and a downstream outlet section AA relative to air flow direction in the air recycling conduit 350. Preferably, circulating air UL is conveyed, especially by air circulation ventilator 320, and/or, for example, fresh air is supplied in a drier zone 170, especially by an air supply element 330, such that circulating air UL, especially with a proportion of fresh air FL, can be circulated through the polymer gel, for example in a number of drier zones 110, 120, 130, 140, 150, 160, 170. In one or more of the last zones, e.g. 170, the circulating air UL is removed at least partly as recycled air from the last drier zone 170 in conveying direction C by means of the air withdrawal conduit 340. In order to not allow saturation with moisture from the amount of water evaporated out of the product to become too high, it has been found to be advantageous to undertake the removal of recycled air RL via an air withdrawal conduit 340 from a drier zone in the downstream region of the drier setup 101 in conveying direction C. The downstream region of the drier setup 101 is especially restricted to the downstream half of the drier setup. Correspondingly, the upstream region of the drier setup 101 is especially restricted to the upstream half of the drier setup. In operation, the upstream region preferably has an absolute moisture content of the drying air (as loading of dry air) in the range from 100 to 250 g/kg. The upstream region of a drier setup 101 is set up to have an absolute moisture content of the drying air in the range from 100 to 250 g/kg. In operation, the downstream region has an absolute moisture content of the drying air (as loading of dry air) in the range below 100 to 150 g/kg, especially below 100 g/kg. More particularly, there is an absolute moisture content of the recycled air below 50 g/kg in the recycled air RL. More particularly, the recycled air RL is fed back to the drier setup 101 in an air-supplying section 370 in a upstream region of the drier setup 101 in conveying direction C, the upstream region preferably being limited to the upstream half of the drier setup. Recycling of the recycled air RL in one of the upstream drier zones preferably does not cause any significant increase in the absolute moisture content when it is in the range between 100 g/kg and 350 g/kg.

More preferably, additionally or alternatively to the above proviso, a upstream region of the drier setup 101 is understood to mean that region between the application module 200 and extending as far as a drier zone arranged downstream thereof in conveying direction C in which the absolute air moisture content is still below or at the preferred maximum air moisture content; a preferred maximum air moisture content in all drying zones is in the range between 200 g/kg and 350 g/kg. More particularly, additionally or alternatively to the above proviso, a downstream region of the drier setup 101 is understood to mean that region between the discharge module 300 extending as far as a drier zone arranged upstream thereof counter to conveying direction C in which the absolute air moisture content is still below a further preferred maximum air moisture content, especially below 50 g/kg; a preferred maximum air moisture content of this kind is in the range between 200 g/kg and 350 g/kg.

In general, a particularly preferred profile of preferred maximum absolute air moisture contents in line with conveying direction C of a product stream in the drier setup 101 can be specified as: for example 100 g/kg at the start of a drier setup 101 or 100 g/kg to 250 g/kg in the upstream region of a drier setup 101; 200 g/kg to 350 g/kg, for instance, in a middle region of a drier setup 101 (total maximum absolute air moisture content as loading of dry air); 100 to 150 g/kg, especially below 100 g/kg, in the downstream region of a drier setup 101. In other words, it can be stated that, counter to the conveying direction C of a product stream in the drier setup 101, proceeding from the downstream region of a drier setup 101, an absolute air moisture content as loading of dry air preferably rises constantly, preferably as far as an air supply point in about the middle of the drier setup 101, but at least as far as the next air supply point proceeding from the downstream region of a drier setup 101.

As apparent in FIG. 2, by means of the air withdrawal conduit 340 arranged at a side of the housing 301, recycled air RL is withdrawn from the end module EM through a first throttle 342 with adjustable cross section Q4 and is fed to an air recycling line 354 of the air recycling conduit 350 via an air withdrawal line 341; for instance as shown in FIG. 1. The recycled air RL is withdrawn and conducted in the air withdrawal conduit 340 along the air withdrawal line 341 preferably with a variable flow rate, depending on a throttle setting of the first throttle 342. The crucial factor for this is the further withdrawal of recycled air RL through a second throttle 343 with adjustable cross section Q1 from the last drier zone 310; the recycled air is in turn taken up into the air withdrawal line 341, but via a first bypass line 341.1.

The first bypass line 341.1 is connected to the air withdrawal line 341 at a downstream line section A of the air withdrawal line 341 relative to air flow direction, i.e. downstream of the intake section EA relative to air flow direction—here for formation of a first air-removing section A1 with increase in cross section Q1 above the conveyor belt 400 and for formation of a fourth air-removing section A4 with increase in cross section Q4 beneath the conveyor belt 400. The embodiment of FIG. 2 accordingly shows two throttles 342, 343, each of which can alter the cross section Q4, Q1 of an air withdrawal line 341 through which air can flow, or of the first bypass line 341.1 for formation of a recycled air bypass. In this case, the air withdrawal conduit 340, in the region of an air-removing section A, comprises a first bypass line 341.1 with a first throttle 343 as recycled air bypass. The air-removing section A is formed downstream, relative to air flow direction, of an upstream intake section EA, relative to air flow direction, of the drier setup 101 (and upstream, relative to air flow direction, of a downstream output section AA, relative to air flow direction, for the air recycling conduit 350, which is shown in detail by way of example in FIG. 3A and FIG. 3B). A flow cross section in the air-removing section A of the air withdrawal conduit 340 is provided with an increase in cross section Q1 owing to the incoming recycled air bypass formed with the first bypass line 341.1. The increase in cross section Q1 is such that the recycled air RL is removed at a reduced flow rate in the air-removing section A of the air withdrawal conduit 340. In addition, with the total cross section of the bypass line 341.1 and the air withdrawal line 341, an adjustable, very much greater cross section is available for withdrawal of recycled air RL from the end module EM; as a result, recycled air RL is also withdrawn from the drier setup 101 at a reduced flow rate in the upstream intake section EA relative to air flow direction. The flow rate in the air-removing section A—but at least at the points of the increase in cross section Q1 and Q4 in the air-removing section A—in the air withdrawal line 341 is lower than an intake rate at the upstream intake section EA relative to air flow direction without the increase in cross section Q1, Q4 mentioned, owing to the first bypass line 341.1 or the increase in size of the intake section EA.

The intake of particles into the air withdrawal line 341 is already considerably reduced in the region of the intake section EA because it is formed with increased size; this advantage is especially valuable in the case of an intake section EA close to the base, since probability of intake for particles from the base is particularly high at that point. Moreover, unwanted further transport of particles that have been taken is avoided, but at least considerably reduced owing to said increase in cross section Q1.

It is possible in principle, but not obligatory, to remove recycled air RL in the air withdrawal conduit 340 with a varied flow rate over the course of the assigned air withdrawal line 341. In this case, the air withdrawal conduit 340 comprises the air withdrawal line 341 and the first bypass line 341.1; herewith a first throttle 342 beneath the conveyor belt 400 and with a second throttle 343 above the conveyor belt 400. For that purpose, the two throttles each have a throttle valve which is adjustable in a variable manner, especially actively controllable by open-loop and/or closed-loop control. A total cross section of the bypass line 341.1 and the air withdrawal line 341 is thus adjustable in a variable manner.

In the present case, recycled air RL is withdrawn from the end module EM beneath the conveyor belt 400. Intake of particles and/or dust with the recycled air RL into the air recycling line 341 can be kept low overall by adjusting the flow rate to such a low level that polymer particles or other particles or dust cannot even get into or else settle out in the air recycling line 341 before they arrive in the recycling line 354; in other words, more particularly, before they get to internals in the air recycling conduit 350, especially to heating registers or feed air heaters present therein. In this case, polymer particles 500 that have settled out collect at the lower end of the air withdrawal line 341 in a settling region 347.

Through the variable cross section of the first throttle 342, it is possible to adjust the flow rate to such a low level that particles can settle out. If necessary, the flow rate of recycled air RL can additionally be adjusted with a variable cross section of the second throttle 343, also called recycled air bypass throttle. The first and second throttles 342, 343 may each take the form of a throttle valve. The air withdrawal conduit 340, in the present case, additionally has a settling region 347 which features an increased cross section compared to the cross section of the rest of the air recycling line 341; for this purpose, for example, it is possible to utilize a curve, corner or bend in the air recycling line 341.

In addition, it is possible in a modification that the air withdrawal line 341 has an adjustable cross section which is variable in principle in terms of its cross section value in the downstream air flow direction by means of a third throttle 344, also called overall throttle, shown in FIG. 1 and FIG. 3A; this is an additional means of adjustment for adjusting the flow rate in said cross section of the air recycling line 354. In this way, it is also possible to promote "fallout" of particles out of the recycled air RL, provided that it is possible to accept an associated small reduction in the total recycling output for the recycled air RL.

FIG. 3A shows, in schematic form—in a section in line with conveying direction C, wherein the above-described air withdrawal conduit 340 in FIG. 3A (and also in FIG. 3B) has been projected into this section in line with conveying direction C for illustrative understanding—an execution of the first embodiment which has been developed further with respect to the first embodiment of FIG. 2, namely with regard to the air withdrawal conduit 340 and the air recycling conduit 350 in the end module EM of the last drier zone 310; this essentially corresponds to a more detailed illustration of FIG. 1.

As shown in FIG. 3A, it is possible by means of one or more additional downstream filters 353 relative to air flow direction to reduce the entrainment of particles, especially also ultrafine particles, but taking account of any pressure drop. Analogously, filters may also be incorporated into an air withdrawal line 341 or else into a bypass line 341.1.

For this purpose, FIG. 3A in turn shows the air withdrawal conduit 340 in the region of a first air-removing section A1—as referred to in FIG. 2; by A therein—and a first bypass line 341.1 and with the first throttle 343 as recycled air bypass. The first air-removing section A1 here—as in FIG. 2—is formed with a vertical line section of an air withdrawal line 341, where the vertical line section of the air withdrawal line 341 has the increase in cross section Q1.

In addition, in the region of a second air-removing section A2, a second bypass line 341.2 has been provided here with a fourth throttle 345 as air supply bypass throttle, namely in an air supply bypass for external fresh air FL. In this respect, in this embodiment, recycled air RL—via recycled air bypass of the first bypass line 341.1 and fresh air FL via air supply bypass of the second bypass line 341.2—can be introduced into the air withdrawal conduit 340 and then into the air recycling conduit 350. Corresponding lines such as the air withdrawal line 341, the bypass line 341.1 and the air recycling line 354, with their internals such as ventilators 351, heat exchangers 352 and filters 353, are parts of the ventilation setup 102 in the periphery of the drier setup 101 (FIG. 1, FIG. 4), shown in each of FIG. 2, FIG. 3A and FIG. 3B by a housing 301 of the end module EM for the last drier zone 310.

FIG. 3B shows, in schematic form, a second embodiment of an air circulation belt drier with an end module EM of the last drier zone 310 in conveying direction C upstream of a discharge module 300, developed further with respect to the first embodiment of FIG. 1 to FIG. 3A. FIG. 3B shows this in a section in line with conveying direction C, wherein the above-described air withdrawal conduit 340 in FIG. 3A has been projected into this section in line with conveying direction C for illustrative understanding.

In the case of the second embodiment, an air withdrawal line having a centrifugal separator 349 is shown in the air withdrawal conduit 340. The centrifugal separator 349, optionally with further active elements, is configured such that entrained polymer particles will settle out.

More particularly, the entrained polymer particles can settle out above the deflecting roll 410B of the conveyor belt 400. More particularly, it is possible for particles and/or fine dusts to settle out of the drier setup 101 to an increased degree close to a line intake region by virtue of the dried superabsorbent polymer 420 being thrown off; this is also enhanced by the crushing in a crusher 410C which can take the form, for example, of a cross-vane comminutor.

As elucidated further with reference to FIG. 6, aspects of the first and second embodiments shown in FIG. 3A and FIG. 3B can be combined in an embodiment which is not shown here. More particularly, it is advantageous, for example—as shown by the representative example in FIG. 6E—to provide for widening of an air withdrawal line 341. The widening of an air withdrawal line 341 can additionally or alternatively be achieved by means of a line intake region 341L of large cross section as elucidated in detail in FIG. 6E. Examples of a line intake region 341L of large cross section are shown with dotted lines in FIG. 6E as a cylindrical flow channel 341Z and/or a widening diffuser, funnel or similar flow channel form 341D, or a settling chamber or similar widening. A line intake region 341L of large cross section as elucidated in detail in FIG. 6E already reduces the risk of intake of particles into the air withdrawal line 341.

In the housing of the discharge module 300, there may be mounted a flange 302 having the connection to a centrifugal separator 349, for example a cyclone. It is possible for particles and ultrafine particles to settle out therein to form a third air-removing section A3 with an increase in cross section Q3. In industrial scale plants, cyclones serve to separate out both solid particles and liquid particles; in this respect, a centrifugal separator is particularly suitable for separating out water-absorbing polymer particles having residual moisture. In the centrifugal separator 349 (as opposed to a centrifuge), the recycled air RL as carrier is set in rotating motion by virtue of its own flow rate and corresponding construction of the centrifugal separator 349. The centrifugal forces that act on the particles accelerate them radially outward. They are separated from the stream of recycled air RL, which is directed inward and removed into a central immersed tube which forms the continuation of the air recycling line 354. Positioning in the discharge module 300 permits the direct recycling of the particles that have settled out into the output to the crusher 410C. Any other positioning including above a "bigbag", for example, for discharging and collecting of the particles that have settled out is conceivable.

In the air withdrawal line 341, a centrifugal separator 349, similarly to a settling region 347, additionally offers a further means of cleaning the overall air with respect to unwanted particles and ultrafine dusts, and hence of reducing blockage and sticking of the heat exchanger 351, ventilator 352 or other internals in the air recycling line 354. The option shown here of integrating a centrifugal separator is also possible in other positions in the air circulation belt drier 1000. The centrifugal separator 349 shown in FIG. 3B is connected at an air recycling line 354 to a third throttle 344 as overall throttle, by means of which recycled air RL that has been freed of particles can be fed back via the air circulation internals, such as the heat exchanger 352 and ventilator 351, to the air recycling conduit 350.

FIG. 4 shows, in schematic form, an end module EM upstream of the discharge module 300 which, as the last drier zone 310, with an air withdrawal conduit 340 as in FIG. 1 and FIG. 3A and with an air recycling conduit 350 which is connected again to a drier setup 101 for recycling of recycled air RL into the drier setup 101. Connected on top of the drier setup 101 is a ventilation setup 102—as shown in FIG. 1—wherein the drier setup 101 in combination with the ventilation setup 102 is referred to here as drying module 100. As part of the ventilation setup 102, the air recycling conduit 350 has a number of internals, namely in the present case a ventilator 351 for circulation of the recycled air RL and/or fresh air FL and a heat exchanger 352.

In addition, in the air circulation belt drier 1000 shown in schematic form in FIG. 4, a waste air conduit 360 for guiding moisture-laden waste air AL is provided, wherein the waste air AL is not intended for recycling, but is released into the environment via a release throttle 362. The waste air conduit 360 likewise has internals, such as a ventilator 361 for sucking in the moisture-laden waste air AL from one or more drier zones TZi (i=1 . . . n) and for release thereof to the environment via the release throttle 362. Of the five drier zones TZi (i=1 . . . n=5), by way of example, the last three drier zones TZ_n−2, TZ_n−1 and TZ_n (end module EM for the last drier zone 310/TZ_n before the discharge module 300) of the drier setup 101 are shown.

By contrast with the embodiments detailed so far, in the belt drier 1000 of FIG. 4, at the end region, in each case, a penultimate drier zone TZ_n−1 and that before (TZ_n−2) are equipped with a number of four or five identically designated heat exchangers WT1, WT2, WT3, WT4, WT5; these may each take the form, for example, of part of a drying module which can be assembled together with the others to form a drier zone TZ_i (i=1 . . . n; here n=5)—the last drier zone TZ_n (last drier zone 310 with end module EM before the discharge module 300) has an air circulation ventilator 320 and an air supply element 330, for example an air valve; the combination of an air circulation ventilator 320 and an air supply element 330 can also be referred to as air circulation unit. In a modification which is not shown here, it is also possible for multiple air circulation ventilators 320 and/or air supply elements 330 each to be provided in the drier zones TZi (i=1; here n=5).

In this manner specified by way of example here, it is also possible for multiple drier zones TZi (i=1 . . . n; here n=5) to be combined to form an otherwise unspecified control zone; for each control zone, it is possible (substantially independently of others) for otherwise unspecified temperature and pressure sensors to be provided. These may serve merely as measurement points or additionally or alternatively as open-loop and/or closed-loop control sensors for example. In addition, each drier zone TZ_n, TZ_n−1, in the present case has at least one air supply element 330 and/or a waste air element 363—shown here in each case as a throttle valve.

The discharge module 300 is referred to separately in the present case. The last drier zone 310, TZ_n, also referred to as the end zone—as in the embodiments elucidated above—has an air circulation ventilator 320 and an air supply element 330. Also shown are the first throttle 342 shown as a throttle valve for formation of a recycled air throttle in the air withdrawal line 341, and the second throttle 343 for formation of a recycled air bypass throttle in the first bypass line 341.1 for formation of an air supply bypass. The third throttle 344 as overall throttle is mounted in the air withdrawal line 341 to the air recycling line 354 in order to regulate the stream of recycled air RL. The fourth throttle 345 for formation of an air supply bypass throttle is arranged in the second bypass line 341.2 for formation of an air supply bypass.

FIG. 5 shows, in schematic form, the sequence of a production process in which the steps of polymerizing S1, drying S2 and crushing S3 are shown.

For drying S2, in step L2, recycled air from the drier setup 101 is removed at least partly into the air withdrawal conduit 340. In step L1, the recycled air RL is fed back to the drier setup 101 via the air recycling conduit 350. In a step L3, there are three options in principle for the guiding of the recycled air RL in the air withdrawal conduit 340 to the air recycling conduit 350, which can be utilized—alone or in combination—as shown here. All options serve to provide a flow cross section in the air-removing section A, A1, A2, A3 of the air withdrawal conduit 340 with an increase in cross section Q, Q1, Q2, Q3. The increase in cross section is such that the recycled air RL, at least in the air-removing section A, A1, A2, A3 of the air withdrawal conduit 340, is removed at a flow rate less than an intake rate in the upstream intake section EA relative to air flow direction. Additionally or alternatively, an increase in cross section Q4 as mentioned may additionally be provided in the upstream intake section EA relative to air flow direction in the drier setup 101.

The basic option is to remove recycled air RL via the air withdrawal line 341 only in a step L30. Should the flow rate (optionally in view of the comparatively low cross section) in the air withdrawal line 341 be at too high a level, a first option is to adjust the aforementioned third throttle 344 as overall throttle.

In a first further option L31, the first bypass line 341.1 can be utilized as recycled air bypass; this is represented by the corresponding arrow symbol for the first option L31. For example, in one embodiment, an air withdrawal line 341 may be provided with the first bypass line 341.1.

A second option L32 is to utilize a second bypass line 341.2 as air supply bypass; this is shown by the corresponding arrow symbol for the second option L32. For example, in another embodiment, an air withdrawal line 341 may be implemented with a second bypass line 341.2.

A third option L33 is to utilize a settling chamber 348 arranged in the air withdrawal line 341, a centrifugal separator 349 or, in the simplest case, a widening in the flow cross section, such as a line intake region 341L of large cross section (for example of a cylindrical, oval, angular, especially square or rectangular, flow channel 341Z and/or a widening diffuser, funnel or similar flow channel form 341D or similar widening of the air withdrawal line 341) or a settling region 347 in order to lower the flow rate in the air withdrawal line 341; this is shown by the corresponding arrow symbol for the third option L33. For example, a plant according to option L33 may be implemented merely with an air withdrawal line 341 and a settling chamber 348.

Options L31, L32, L33 may be implemented in construction terms independently of one another and, once fixed, may at first be invariable, i.e. variable but fixed. However, it is also possible in the case of the air circulation belt drier 1000 to combine and/or alter the options according to the circumstances, i.e. to switch them on or off and/or to adjust a throttle setting of the throttles 342, 343, 344, 345 or a filter 353 shown in FIG. 3A for open-loop and/or closed-control purposes.

FIG. 6 shows, in symbolic form, five particularly preferred examples for implementation of an air guiding means 600 in a line section of an air withdrawal line 341 for conduction of recycled air RL, in principle as described above, which are implementable individually or in any combination with one another in modified embodiments. For this purpose, air guiding means 600 of FIG. 6A to FIG. 6F are executed in different preferred modifications for formation of an air-removing section A1, A2, A3, A4 having an increase in cross section Q1, Q2, Q3, Q4.

Accordingly, an increase in cross section Q1, Q2, Q3, Q4 is generally understood to mean that the air-removing section A1, A2, A3, A4 has an increased cross section compared to another cross section of an air withdrawal line, such that the recycled air RL, at least in the air-removing section A1, A2, A3, A4 of the air withdrawal conduit, is removed at a reduced flow rate compared to the other cross section.

An increase in cross section that increases a cross section of the air-removing section of the air withdrawal conduit should especially be understood to mean that the cross section of the air-removing section A1, A2, A3, A4 of a first upstream cross section relative to air flow direction is expanded to a second downstream cross section relative to air flow direction—this is the case at least in the examples of FIG. 6A, FIG. 6B, FIG. 6F.

In this respect, an increase in cross section is additionally or alternatively especially also understood to mean that the air-removing section in the upstream intake section of the drier setup relative to air flow direction has a line intake region having a cross section that forms a significantly enlarged intake region—this is the case at least in the example of FIG. 6E. More particularly, the line intake region in that case is of increased size compared to a further air withdrawal line of the air withdrawal conduit, especially of increased size compared to an air conduit cross section in a conveying means in an air recycling conduit. Correspondingly, a line intake region may have an enlarged cylindrical, oval, angular, especially square or rectangular, or differently shaped cross section of a flow channel, in order to form the enlarged intake region. The line intake region may also take the form, for example, of a diffuser, funnel or similar flow channel form for formation of an enlarged intake region.

Thus, in a first variant of the concept, it may generally be the case that the recycled air at least in the air-removing section of the air withdrawal conduit is removed at a reduced flow rate. This can be implemented, for example, in that one or more bypass lines 341.1, 341.2 to an air withdrawal line 341 in the air withdrawal conduit are provided—this is the case at least in the examples of FIG. 6C, FIG. 6D. Owing to a bypass line in the air withdrawal conduit, the total cross section (Q> plus Q<) of the air-removing section of the air withdrawal conduit is increased in the manner of the concept, namely in that the air withdrawal conduit now has the cross section Q< of the air withdrawal line 341 and the cross section Q> of the bypass line 341.1 rather than just the cross section of the air withdrawal line. Because of an increased total cross section (Q> plus Q<) of the air withdrawal conduit, overall, the recycled air is removed at a reduced flow rate at least in the air-removing section of the air withdrawal conduit; in this case, the reduced flow rate is especially reduced compared to a downstream cross section of an air withdrawal line relative to air flow direction.

Advantageously, and additionally or alternatively, the cross section of the air-removing section of the air withdrawal conduit is increased, for example gradually or stepwise over the course of the air-removing section; in other words, the cross section of the air-removing section increases from a first upstream cross section relative to air flow direction to a second downstream cross section relative to air flow direction—this is the case at least in the examples of FIG. 6A, FIG. 6B, FIG. 6F.

But also with regard to the above example of the bypass line, this second downstream increased cross section relative to air flow direction can be formed at the connection point of the bypass line to the air withdrawal line—i.e. in the air-removing section A1 (FIG. 6D) or in the air-removing section A2 (FIG. 6C). In FIG. 6C and FIG. 6D, this is shown by the bypass lines 341.1' and 341.2' widened at the connection point, which are drawn as dotted lines; in this respect, a particularly preferred combination of a bypass line 341.1 and 341.2 as such is implemented with an increased cross section of the air-removing section A1, A2 by means of the bypass lines 341.1' and 341.2' that have been widened at the connection point.

Additionally or alternatively, this second downstream increased cross section relative to air flow direction may also be formed in a different way in the air withdrawal line, for example by means of a settling chamber, a centrifugal separator or an expansion region of the air withdrawal line over the course of the air withdrawal line—this is the case at least in the examples of FIG. 6A, FIG. 6B, FIG. 6F. In this way, the recycled air at least in the air-removing section of the air withdrawal conduit (for example in the downstream increased cross section relative to air flow direction) is removed at a reduced flow rate lower than an intake rate in the intake section of the air withdrawal conduit.

It is generally the case, in a second variant of the concept, additionally or alternatively, that the recycled air at least in an intake section of the air withdrawal conduit of increased cross section is removable at a reduced intake rate. This can already be achieved by means of a line intake region of large cross section in the air withdrawal line—this is the case at least in the example of FIG. 6E. As a result, overall, the recycled air at least in the intake section EA of increased cross section—as the air-removing section of the air withdrawal conduit—is removed at a reduced flow rate; in this case, the reduced flow rate is especially reduced compared to a downstream cross section of an air withdrawal line relative to air flow direction.

All the above details with regard to the reduced flow rates and increased increases in cross-sectional area are applicable with reference to equal air conveying rates.

An increase in cross section Q1, Q2, Q3, Q4 is formed as the difference between a greater cross section Q> in the air guiding means and an upstream smaller cross section Q< relative to air flow direction in the line section of the air withdrawal line 341 and is shown by way of example in FIG. 6A to FIG. 6F.

Specifically, FIG. 6A shows a line section of the air withdrawal line 341 similarly to FIG. 3B, wherein the air guiding means 600A takes the form of a centrifugal separator 349 which, in the air-removing section A3, i.e. within the centrifugal separator 349, has a greater cross section Q> exceeding the smaller cross section Q< of the air withdrawal line 341 in an upstream line section relative to air flow direction. Recycled air RL is introduced into the centrifugal separator 349 at the side, circulated and sucked out through an immersed tube to form the further air recycling line 354. As a result of centrifugal force and gravity, polymer particles 500 can settle out in the lower region of the centrifugal separator 349 and be withdrawn via a flap or similar valve 501.

In quite a similar manner, FIG. 6B shows an air guiding means 600B in a line section of the air withdrawal line 341 in the form of a settling chamber 348. The air-removing section A3' within the settling chamber 348 has a greater cross section Q> compared to an upstream section Q< of the air withdrawal line 341 relative to air flow direction, so as to form an increase in cross section Q3=Q>−Q< in the air-conducting section A3'. As a result of the slowing of the flow in the air-conducting section A3', particles, owing to their weight, can become detached from the air stream of the recycled air RL against the lower kinetic energy of the air flow in the air-conducting section A3' and settle out in the lower region of the settling chamber 348. The particles 500 that have settled out can be withdrawn via suitable flaps or valves 501. FIG. 6C shows a line section of the air withdrawal line 341 where a second bypass line 341.2 connects to the air withdrawal line 341, namely in the manner of a T-shaped line connection of the second bypass line 341.2 and the air withdrawal line 341. In this way, a stream of fresh air FL can be added to the stream of recycled air RL. With regard to an assumption of an equal amount of air being conveyed (compared to a situation without the bypass line 341.2), even on the basis of the second bypass line 341.2, a total cross section of the air withdrawal conduit is increased from "Q<" to "Q< plus Q>". In addition, however, an air-removing section A2 forms in the T-shaped line connection of the air withdrawal line 341 to the second bypass line 341.2, in such a way that it has a greater cross section Q> than a small cross section Q< in an upstream section of the air withdrawal line 341 relative to air flow direction. In the air-removing section A2, there is thus an increase in cross section Q2=Q>−Q<, which leads to a reduced flow rate in the stream of recycled air RL in the air withdrawal line 341, especially reduced compared to an upstream cross section of the air withdrawal line relative to air flow direction, but at least in the air-removing section A2, i.e. in the region of the increase in cross section, Q2=Q>−Q<. One may assume that, in relation to normally equal flow rates of the fresh air FL and recycled air RL, in the case of FIG. 6C, the air-removing section A2 is additionally increased to a particularly large size, for example by means of roundings, bulges or the like; this is shown more particularly in the case of the dotted bypass line 341.2'. Overall, all the aforementioned measures, alone or in combination, lead to a reduced flow rate in the stream of recycled air RL in the air withdrawal line 341, especially in the region of the air-removing section A2 of increased cross section.

Particles in the stream of recycled air RL can thus precipitate out of the air stream of recycled air RL and collect in a lower upstream section of the air withdrawal line 341 (not shown here). The upstream section of the air withdrawal line 341 upstream of the T-shaped line connection to the second bypass line 341.2 preferably has a vertical profile.

Preferably, the bypass air stream in the second bypass line 341.2 already reduces the air intake rate in the intake section EA of the air withdrawal line 341, which already avoids the entrainment of particles into the air recycling line from the last drier zone 310.

FIG. 6D shows an air guiding means 600D in a line section of the air withdrawal line 341 formed by means of a first bypass line 341.1 to the air withdrawal line 341. With regard to an assumption of an equal amount of air being conveyed (compared to a situation without the bypass line 341.1), even on the basis of the first bypass line 341.1, a total cross section of the air withdrawal conduit is increased from "Q<" to "Q< plus Q>". Moreover, however, an air-removing section A1 is formed in the essentially T-shaped line connection of the first bypass line 341.1 and the air withdrawal line 341 with a greater cross section Q> exceeding a smaller cross section Q< in an upstream section of the air withdrawal line 341 relative to air flow direction. In this way, in the air-removing section A1, an increase in cross section Q1=Q>−Q< is thus formed, which leads to a corresponding reduction in flow rate in the air stream of recycled air RL in the air withdrawal line 341, especially reduced compared to an upstream cross section of the air withdrawal line relative to air flow direction, but at least in the air-removing section A1, i.e. in the region of the increase in cross section, Q1=Q>−Q<. One may assume that, in relation to normally equal flow rates of the recycled air RL, in the case of FIG. 6D, the air-removing section A1 is additionally increased to a particularly large size, for example by means of roundings, bulges or the like; this is shown more particularly in the case of the dotted bypass line 341.1'. Overall, all the aforementioned measures, alone or in combination, lead to a reduced flow rate in the stream of recycled air RL in the air withdrawal line 341, especially in the region of the air-removing section A1 of increased cross section. This in turn causes resultant precipitation of entrained particles owing to their weight. The particles 500 can settle out in a settling region 347 of a lower portion of the essentially vertical air withdrawal line 341.

Furthermore, a more general effect arises in that the air withdrawal line 341 can be virtually doubled in cross section, but it is at least the case that the total cross section of the air withdrawal line 341 and the first bypass line 341.1 distinctly exceeds that of the air withdrawal line 341. It is thus generally the case that the flow rate is reduced in a lower cross section Q> of the air withdrawal line 341, namely in an intake section EA. This already has the effect that comparatively few particles get into the air withdrawal line 341. If necessary, a throttling means in the first bypass line 341.1 can be used to open it to such a degree that a main portion of the flow leads through the first bypass line 341.1 to the air withdrawal line 341; in other words, the main portion of the flow of the recycled air RL is guided through the first bypass line 341.1 rather than directly through the air withdrawal line 341 in the intake section EA. This has the advantage that the strength of a flow of recycled air RL close to the base of the air withdrawal line 341 in the lower region is kept substantially at a low level. The effect of this in turn is that the intake of polymer particles is already kept low. For example, it would be possible to lower the flow rate at an increase in cross section in an air-removing section of the air withdrawal conduit to less than 50% of the flow rate in a conveying means for the recycled air in the air withdrawal conduit and/or the air recycling conduit by means of a suitable increase in cross section in the air-removing section (for example as elucidated by FIG. 6(A, B, C, D, F)), and it could be lower than an intake rate in the intake section.

FIG. 6E shows an air guiding means 600E which is more preferably suitable for combination with the above-elucidated air guiding means 600A to 600D, namely with formation of a comparatively large cross section Q> in the intake section EA of the air withdrawal line 341. For this purpose, the air withdrawal line 341 at the intake section EA has a suitable line intake region 341L of large cross section, for example here a cylindrical flow channel 341Z (shown by solid lines) and/or a widening diffuser, funnel or similar flow channel form 341D (shown by dotted lines). A settling region 347 with increased cross section may additionally or alternatively be executed with Q>, especially in the region of a deflection of the air withdrawal line 341. The effect of both is to give an increase in cross section Q4=Q>. This in turn leads to entrained polymer particles falling out of the recycled air RL owing to their weight, or already keeps the intake of polymer particles low as a result of the cylindrical or diffuser-like widening of the cross section Q> in the line intake region 341L of the intake section EA. For example, it would be possible to lower the intake rate of the recycled air in the line intake region 341L of the intake section EA of the air withdrawal line 341 to less than 50% of the flow rate at a conveying means, for example a ventilator 351 in the recycling line 354 shown in FIG. 1 to FIG. 4, for the recycled air RL in the air withdrawal conduit 340 and/or the air recycling conduit 350 by means of a suitable increase in cross section in the line intake region 341L of the intake section EA (for example as elucidated with reference to FIG. 6E relating to a cylindrical flow channel 341Z or a widening flow channel form 341D). In principle, it is found that—even though lowering of an intake rate of the recycled air in the line intake region 341L of the intake section EA of the air withdrawal line 341 to less than 50% of the flow rate at a conveying means is particularly advantageous—even lowering the intake rate of the recycled air at the line intake region 341L of the intake section EA of the air withdrawal line 341 to less than 90%, especially 80%, especially 70%, of the flow rate at a conveying means has advantages and brings an improvement for the purposes of the object of the invention.

FIG. 6F illustrates in a symbolic manner that the concept of the invention can also be implemented in the context of a horizontal line section. For this purpose, the aforementioned measures of sections A, A1, A2, A3, A4 of the air withdrawal conduit 340 and/or air recycling conduit 350 by means of a horizontal line section of an air withdrawal line 341 are detailed, where the horizontal line section of the air withdrawal line 341 and/or air recycling line 354 has the increase in cross section Q, Q1, Q2, Q3, Q4 in the form of one or more cross section-increasing air guiding means.

REFERENCE NUMERALS

1000 air circulation belt drier
10A heating register and/or ventilator installed at the bottom
10B heating register and/or ventilator installed at the top
100 drying module
101 drier setup
102 ventilation setup
110 drier zone 1
120 drier zone 2
130 drier zone 3
140 drier zone 4
150 drier zone 5
160 drier zone 6
170 last drier zone
200 product application module
210 product dispensing
300 discharge module
301 housing
302 flange
310 last drier zone
320 air circulation ventilator
330 air supply element
340 air withdrawal conduit
341 air withdrawal line
341.1, 341.1' first bypass line, recycled air bypass
341.2, 341.2' second bypass line, air supply bypass
341L line intake region of large cross section
341Z e.g. cylindrical or angular flow channel
341D e.g. widening flow channel form
342 first throttle with throttle valve, air withdrawal throttle
343 second throttle with throttle valve, air withdrawal bypass throttle
344 third throttle with throttle valve, overall throttle
345 fourth throttle with throttle valve, air supply bypass throttle
346 air supply line
347 settling region
348 settling chamber
349 centrifugal separator
350 air recycling conduit
351 ventilator
352 heat exchanger
353 filter
354 air recycling line
360 waste air conduit
361 ventilator
362 release throttle
363 waste air element
370 air-supplying section
400 conveyor belt 410A, 410B upstream deflector roll, downstream deflector roll
410C crusher
420 dried superabsorbent polymer
430 shaft
431 guiding means
432 seal
500 settled polymer particles
501 valve
C, C' conveying direction, opposite flow direction to conveying direction
A, A1, A2, A3, A4 air-removing section
Q, Q1, Q2, Q3, Q4 increase in cross section
AA outlet section
EA intake section
AL waste air
FL fresh air
UL circulating air
RL recycled air
TZ drier zone
WT heat exchanger
TM drier module
EM end module
EZ end zone

The invention claimed is:

1. A production process for production of water-absorbing polymer particles, where the production process has the following steps:
polymerizing an aqueous monomer solution or suspension for production of an aqueous polymer gel,
drying the aqueous polymer gel in a belt drier with a conveyor belt, by accommodating the aqueous polymer gel on the conveyor belt and conveying the aqueous polymer gel on the conveyor belt in a conveying direction (C),
crushing and/or grinding the dried polymer gel to give water-absorbing polymer particles, where
for drying:
the belt drier comprises a drier setup (101) substantially comprising the conveyor belt and an air recycling conduit (350) downstream of the drier setup (101) for air recycling, where recycled air (RL) is withdrawn from the drier setup (101) and fed back to the drier setup (101) via the air recycling conduit (350), and
the air recycling conduit (350) has an air withdrawal conduit (340) formed between an upstream intake section (EA) relative to air flow direction in the drier setup (101) and a downstream outlet section (AA) relative to air flow direction in the air recycling conduit (350), characterised in that
the air withdrawal conduit (340) has an air withdrawal line (341) and air recycling line (354) with at least one filter (353), heat exchanger (352) and/or ventilator (351),
a flow cross section in at least one air-removing section (A, A1, A2, A3, A4) of the air withdrawal conduit (340) has an increase in cross section (Q, Q1, Q2, Q3, Q4), where the increase in cross section increases a cross section of the air-removing section (A, A1, A2, A3, A4) of the air withdrawal conduit in such a way that
the recycled air (RL) at least in the air-removing section (A, A1, A2, A3, A4) of the air withdrawal conduit (340) is removed at a reduced flow rate, and/or
the recycled air (RL) at least in an intake section (EA) of increased cross section in the air withdrawal conduit (340) is removed at a reduced intake rate.

2. The production process according to claim 1, wherein the recycled air (RL) in a last drier zone (170) and/or another drier zone (TZ_n−2, TZ_n−1, TZ_n) in conveying direction (C) is removed in the downstream region of the drier setup in conveying direction (C), where the air-removing section (A, A1, A2, A3, A4) of the air withdrawal conduit (340) is connected for flow purposes to the last drier zone (170) and/or the other drier zone (TZ_n−2, TZ_n−1, TZ_n).

3. The production process according to claim 1, wherein the air-removing section (A, A1, A2, A3, A4) of the air withdrawal conduit (340) and/or air recycling conduit (350) is formed by means of a vertical line section of an air withdrawal line (341) and/or air recycling line (354), where the vertical line section of the air withdrawal line (341) and/or air recycling line (354) has the increase in cross section (Q, Q1, Q2, Q3, Q4) in the form of one or more cross section-increasing air guiding means.

4. The production process according to claim 1, wherein the air-removing section (A, A1, A2, A3, A4) of the air withdrawal conduit (340) and/or air recycling conduit (350) is formed by means of a horizontal line section of an air withdrawal line (341), where the horizontal line section of the air withdrawal line (341) and/or air recycling line (354) has the increase in cross section (Q, Q1, Q2, Q3, Q4) in the form of one or more cross section-increasing air guiding means.

5. The production process according to claim 1, wherein the air-removing section (A, A1, A2, A3, A4) of the air withdrawal conduit (340) is formed by a line section of an air withdrawal line (341) having the increase in cross section (Q, Q1, Q2, Q3, Q4) in the form of one or more cross section-increasing air guiding means arranged at a level above the conveyor belt (400), or at a level beneath the conveyor belt (400).

6. The production process according to claim 1, wherein an air guiding means is formed by:
a connection of at least one first bypass line (341.1) to a line section of the air withdrawal line (341) for formation of a first air-removing section (A1) with increasing cross section (Q1), where the at least one first bypass line (341.1) is designed to withdraw air from the drier setup (101).

7. The production process according to claim 1, wherein an air guiding means is formed by:
a connection of at least one second bypass line (341.2) to a line section of the air withdrawal line (341) for formation of a second air-removing section (A2) with increasing cross section (Q2), where the at least one second bypass line (341.2) is designed to supply fresh air (FL) from an environment.

8. The production process according to claim 1, wherein an air guiding means is formed by:
a connection of a settling chamber (348) or of a centrifugal separator (349) in the air withdrawal line (341) for formation of a third air-removing section (A3) with increasing cross section (Q3).

9. The production process according to claim 1, wherein an air guiding means is formed in an upstream intake section (EA) by:
a connection of a line intake region (341L) of large cross section in the air withdrawal line (341) for formation of a fourth air-removing section (A4) with increasing cross section (Q4).

10. The production process according to claim 1, wherein circulating air (UL) is circulated through the aqueous polymer gel in a number of drier zones (110, 120, 130, 140, 150, 160) and a last drier zone (170) in conveying direction (C)

and the circulating air (UL) is at least partly removed by means of the air withdrawal conduit (340) as recycled air from the last drier zone (170) in conveying direction (C) or one of the last drier zones.

11. A belt drier that is a circulation belt drier comprising an air circulation belt drier (1000) for guiding circulating air (UL), for drying an aqueous polymer gel and conveying the polymer gel on a conveyor belt, wherein
    the belt drier takes the form of an air circulation belt drier (1000) formed so as to guide circulating air with a drier setup (101) substantially comprising the conveyor belt and an air recycling conduit (350) connected to the drier setup (101), where recycled air (RL) is withdrawn from the drier setup (101) and fed back to the drier setup (101) via the air recycling conduit (350), and
    the air recycling conduit (350) has an air withdrawal conduit (340) formed between an upstream intake section (EA) relative to air flow direction in the drier setup (101) and a downstream outlet section (AA) in the air recycling conduit (350), wherein
    the air withdrawal conduit (340) has an air withdrawal line (341) and air recycling line (354) with at least one filter (353), heat exchanger (352) and/or ventilator (351),
    a flow cross section in at least one air-removing section (A, A1, A2, A3) of the air withdrawal conduit (340) has an increase in cross section (Q, Q1, Q2, Q3, Q4), wherein the increase in cross section increases a cross section of an air-removing section (A, A1, A2, A3) of the air withdrawal conduit (340) in such a way that
    the recycled air (RL) in the air-removing section (A, A1, A2, A3) of the air withdrawal conduit (340) is removed at a reduced flow rate, especially at a reduced flow rate lower than at an upstream cross section of the air withdrawal line relative to air flow direction and/or than an intake rate in the intake section (EA) and/or
    the recycled air (RL) at least in an intake section (EA) of increased cross section in the air withdrawal conduit (340) is removed at a reduced intake rate.

12. The belt drier according to claim 11, wherein the recycled air (RL) in a last drier zone (170) and/or another drier zone (TZ_n−2, TZ_n−1, TZ_n) in conveying direction (C) is removed in the downstream region of the drier setup in conveying direction (C), where the air-removing section (A, A1, A2, A3, A4) of the air withdrawal conduit (340) is connected for flow purposes to the last drier zone (170) and/or another drier zone (TZ_n−2, TZ_n−1, TZ_n) in the downstream region of the drier setup in conveying direction (C).

13. The belt drier according to claim 11, wherein the air-removing section (A, A1, A2, A3, A4) of the air withdrawal conduit (340) is formed by means of a vertical line section of an air withdrawal line (341), where the vertical line section of the air withdrawal line (341) has an increase in cross section (Q, Q1, Q2, Q3, Q4) in the form of one or more cross section-increasing air guiding means.

14. The belt drier according to claim 11, wherein the air-removing section (A, A1, A2, A3, A4) of the air withdrawal conduit (340) and/or air recycling conduit (350) is formed by means of a horizontal line section of an air withdrawal line (341), where the horizontal line section of the air withdrawal line (341) and/or air recycling line (354) has an increase in cross section (Q, Q1, Q2, Q3, Q4) in the form of one or more cross section-increasing air guiding means.

15. The belt drier according to claim 11, wherein the air-removing section (A, A1, A2, A3, A4) of the air withdrawal conduit (340) is formed by a line section of an air withdrawal line (341) having the increase in cross section (Q, Q1, Q2, Q3, Q4) in the form of one or more cross section-increasing air guiding means.

16. The belt drier according to claim 11, wherein an air guiding means is formed by:
    at least one connection of at least one first bypass line (341.1) to a line section of the air withdrawal line (341) for formation of a first air-removing section (A1) with increasing cross section (Q1), where the at least one first bypass line (341.1) is designed to withdraw air from the drier setup (101), where the air withdrawal line (341) has a first throttle (342) and/or a second throttle (343) and/or an overall throttle (344).

17. The belt drier according to claim 11, wherein an air guiding means is formed by:
    at least one connection of at least one second bypass line (341.2) to a line section of the air withdrawal line (341) above the conveyor belt (400) or beneath the conveyor belt (400) for formation of a second air-removing section (A2) with increasing cross section (Q2), where at least one second bypass line (341.2) is designed to supply fresh air (FL) from the environment, where the air withdrawal line (341) has a first throttle (342) and/or an overall throttle (344) and/or an air feed throttle (345).

18. The belt drier according to claim 11, wherein an air guiding means is formed by:
    a connection of a settling chamber (348) or of a centrifugal separator (349) in the air withdrawal line (341) for formation of a third air-removing section (A3) with increasing cross section (Q3), where the air withdrawal line (341) has a first throttle (342) and/or an overall throttle (344).

19. The belt drier according to claim 11, wherein an air guiding means is formed by:
    a connection of a line intake region (341L) of large cross section, in the air withdrawal line (341) for formation of a fourth air-removing section (A4) with increasing cross section (Q4), where the air withdrawal line (341) has a first throttle (342) and/or an overall throttle (344).

20. The belt drier according to claim 11, wherein the circulating air is circulated through the aqueous polymer gel in a number of drier zones (110, 120, 130, 140, 150, 160) and a last drier zone (170) in conveying direction (C) and the drier zones (110, 120, 130, 140, 150, 160) and a last drier zone (170) in conveying direction (C) have at least one air circulation unit (320, 330), where the air circulation ventilator (320, 330) is configured so as to enable air circulation of circulating air, selected from circulating air (UL) and/or fresh air (FL) through the polymer gel and circulating air is at least partly removable as recycled air from the last drier zone (170) in conveying direction (C) in the air withdrawal conduit (340).

21. The belt drier (1000) according to claim 11, wherein an air withdrawal conduit (340) has a settling region (347), designed to reduce the flow rate of recycled air (RL) in such a way that polymer particles entrained in the recycled air (RL).

* * * * *